United States Patent
Shin et al.

(10) Patent No.: US 11,115,393 B2
(45) Date of Patent: Sep. 7, 2021

(54) MESSAGE SERVER, METHOD FOR OPERATING MESSAGE SERVER AND COMPUTER-READABLE RECORDING MEDIUM

(71) Applicant: LINE Corporation, Tokyo (JP)

(72) Inventors: Ki Bin Shin, Tokyo (JP); Jong Il Won, Tokyo (JP)

(73) Assignee: LINE Corporation, Tokyo (JP)

( * ) Notice: Subject to any disclaimer, the term of this patent is extended or adjusted under 35 U.S.C. 154(b) by 44 days.

(21) Appl. No.: 16/269,863

(22) Filed: Feb. 7, 2019

(65) Prior Publication Data

US 2019/0173858 A1   Jun. 6, 2019

Related U.S. Application Data

(63) Continuation-in-part of application No. 15/202,851, filed on Jul. 6, 2016, now Pat. No. 10,230,697.

(30) Foreign Application Priority Data

Oct. 27, 2015   (KR) .......................... 10-2015-0149491

(51) Int. Cl.
  *H04L 29/06*   (2006.01)
  *H04L 9/08*   (2006.01)

(52) U.S. Cl.
  CPC ........ *H04L 63/0442* (2013.01); *H04L 9/0861* (2013.01); *H04L 63/0428* (2013.01); *H04L 63/061* (2013.01); *H04L 63/08* (2013.01)

(58) Field of Classification Search
  CPC . H04L 63/0442; H04L 9/0861; H04L 63/061; H04L 63/08; H04L 63/0428

(Continued)

(56) References Cited

U.S. PATENT DOCUMENTS 6,760,752 B1 *   7/2004   Liu ..................... H04L 63/0428
6,971,022 B1 *   11/2005   Katta .................... G06F 21/602
                                                       380/37

(Continued)

FOREIGN PATENT DOCUMENTS

JP   2000-49850 A   2/2000
JP   2001-014235 A   1/2001

(Continued)

OTHER PUBLICATIONS

Korean Office Action dated Oct. 17, 2016, issued in corresponding Korean Application No. 10-2015-0149491. (no English translation provided).

(Continued)

*Primary Examiner* — Dereena T Cattungal
(74) *Attorney, Agent, or Firm* — Harness, Dickey & Pierce, P.L.C.

(57) ABSTRACT

One or more example embodiments include user terminals, methods, and/or computer-readable recording mediums storing computer programs, in which information encrypted or decrypted not to be decoded by a message server that controls transmission and reception of messages between one or more user terminals is not shared with the message server. One or more example embodiments include user terminals, methods, and/or computer-readable recording mediums storing computer programs, which encrypt a first message by using an encryption key, transmit the first message from a first user terminal to a second user terminal, and decrypt a second message received from the second user terminal by using the encryption key.

15 Claims, 20 Drawing Sheets

(58) Field of Classification Search
USPC .......................................................... 713/171
See application file for complete search history.

(56) References Cited

U.S. PATENT DOCUMENTS

| | | | |
|---|---|---|---|
| 8,239,956 B2 | 8/2012 | Fukasawa | |
| 9,130,744 B1* | 9/2015 | King | H04L 9/14 |
| 2002/0194484 A1 | 12/2002 | Bolosky et al. | |
| 2004/0168055 A1 | 8/2004 | Lord et al. | |
| 2006/0050870 A1* | 3/2006 | Kimmel | H04L 9/088 |
| | | | 380/30 |
| 2006/0277301 A1* | 12/2006 | Takanashi | H04L 63/0442 |
| | | | 709/225 |
| 2007/0136572 A1 | 6/2007 | Chen et al. | |
| 2007/0174636 A1 | 7/2007 | Raja | |
| 2008/0263363 A1* | 10/2008 | Jueneman | G06F 21/32 |
| | | | 713/184 |
| 2010/0293147 A1* | 11/2010 | Snow | G06F 16/10 |
| | | | 707/640 |
| 2011/0099366 A1* | 4/2011 | Kalliola | H04L 51/00 |
| | | | 713/153 |
| 2011/0238859 A1 | 9/2011 | Kitagata | |
| 2012/0177198 A1* | 7/2012 | Cabos | H04L 9/3242 |
| | | | 380/270 |
| 2014/0304505 A1* | 10/2014 | Dawson | G06F 21/6227 |
| | | | 713/165 |
| 2015/0052355 A1 | 2/2015 | Munshi et al. | |
| 2015/0200936 A1 | 7/2015 | Kim et al. | |
| 2015/0371012 A1* | 12/2015 | Quinzin | G06F 21/10 |
| | | | 713/165 |
| 2016/0071034 A1* | 3/2016 | Kushida | G06F 16/148 |
| | | | 705/7.27 |
| 2016/0308840 A1* | 10/2016 | Munshi | H04L 63/083 |
| 2017/0126642 A1* | 5/2017 | Basin | H04L 9/3239 |
| 2018/0183608 A1* | 6/2018 | Koyun | H04L 63/0428 |
| 2019/0260722 A1* | 8/2019 | Basin | H04L 9/0897 |

FOREIGN PATENT DOCUMENTS

| | | |
|---|---|---|
| JP | 2004-240637 A | 8/2004 |
| JP | 2004-295807 A | 10/2004 |
| JP | 2007053569 A | 3/2007 |
| JP | 2008-262282 A | 10/2008 |
| JP | 2009026014 A | 2/2009 |
| JP | 2009-111974 A | 5/2009 |
| JP | 2015-041829 A | 3/2015 |
| JP | 2015-084797 A | 5/2015 |
| KR | 10-2010-0059185 A | 6/2010 |
| KR | 10-2012-0037330 A | 4/2012 |
| KR | 10-20150083650 A | 7/2015 |
| TW | 200719651 | 5/2007 |

OTHER PUBLICATIONS

Korean Office Action dated Sep. 19, 2017 issued in corresponding Korean Application No. 10-2017-0113117 (no English translation provided).

Taiwanese Office Action dated May 7, 2018 in Taiwanese Patent Application No. 105133584.

Japanese Office Action dated Oct. 6, 2020 issued in corresponding Japanese Patent Application No. 2016-208514.

Japanese Office Action dated Jul. 6, 2021 issued in corresponding Japanese Patent Application No. 2016-208514.

* cited by examiner

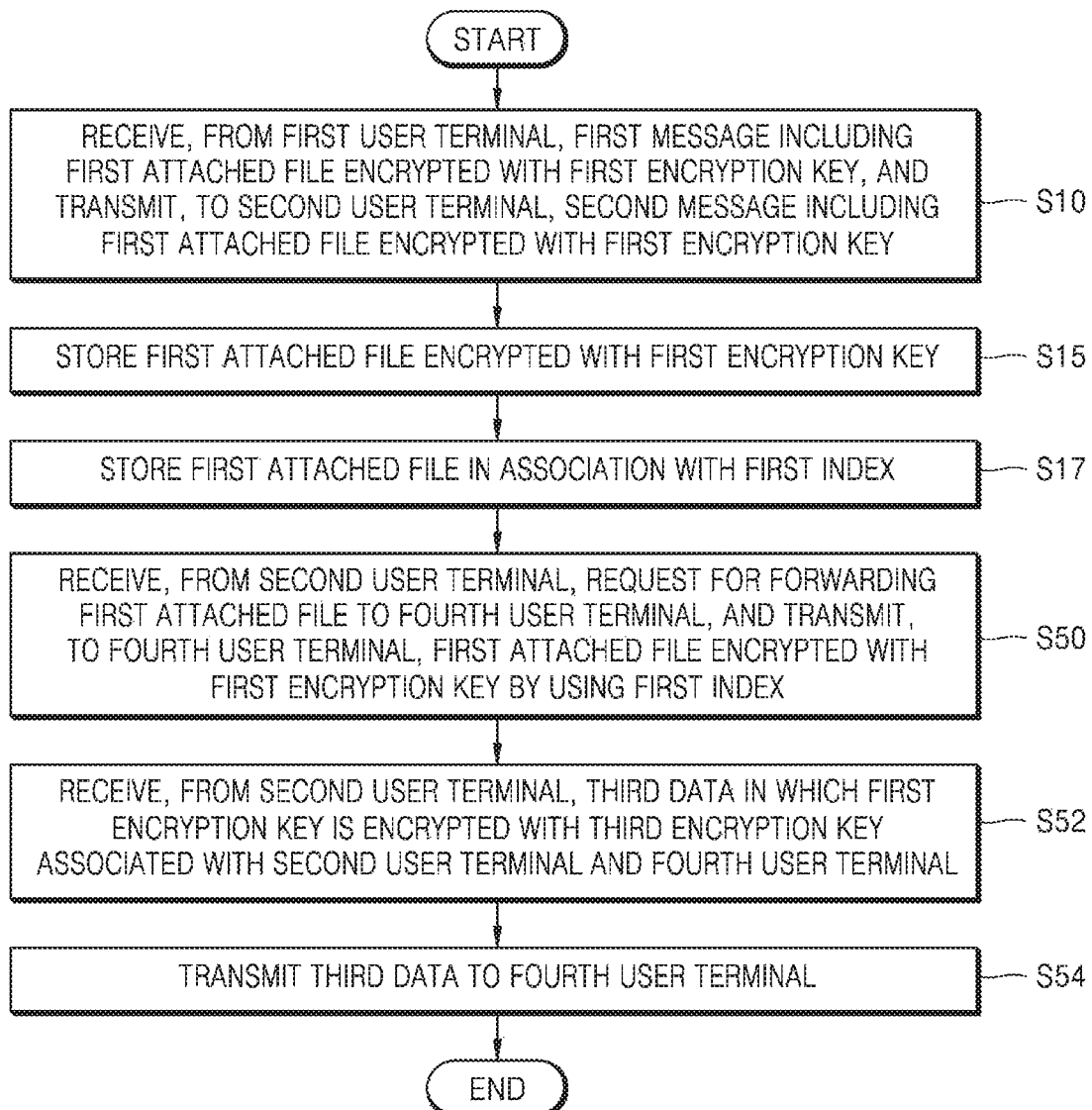

MESSAGE SERVER, METHOD FOR OPERATING MESSAGE SERVER AND COMPUTER-READABLE RECORDING MEDIUM

CROSS-REFERENCE TO RELATED APPLICATION

This application is a Continuation-in-Part of U.S. application Ser. No. 15/202,851, filed on Jul. 6, 2016, which claims the benefit of Korean Patent Application No. 10-2015-0149491, filed on Oct. 27, 2015, in the Korean Intellectual Property Office, the disclosure of each of which is incorporated herein in its entirety by reference.

BACKGROUND

1. Field

One or more example embodiments relate to message servers, methods for operating message servers, and computer-readable recording medium.

2. Description of the Related Art

A messenger-based communication transmits and receives messages between a plurality of terminals and a server. When a first user inputs a text through a message application installed on his or her terminal, the text is transmitted to a message application installed on a terminal of a second user through a server of a corresponding messenger service provider. Most message applications apply an encryption device between a terminal (e.g., smart phone) and a server. It is common that the encrypted message transmitted to the server is decrypted by the server.

According to the related art, messages may be decrypted by the server. Thus, in the event that the server is hacked, messages communicated between users may be opened to the public or may be accessed by an unauthorized third party.

To address such problem, an end-to-end encryption technology, which permits select terminals of users to decrypt messages, has been applied.

However, in a case where the end-to-end encryption technology is applied, the same message is encrypted differently according to a recipient or a sender, and a server needs to individually manage messages between users.

SUMMARY

One or more example embodiments include user terminals, methods, and/or computer-readable recording mediums storing computer programs, in which encrypted information sent from a user terminal is not decrypted by a message server that controls transmission and reception of messages between one or more user terminals, and the information can be shared between the one or more user terminals without being shared with the message server.

One or more example embodiments include user terminals, methods, and/or computer-readable recording mediums storing computer programs, which encrypt a first message by using an encryption key, transmit the first message from a first user terminal to a second user terminal, and decrypt a second message received from the second user terminal by using the encryption key.

Additional aspects will be set forth in part in the description which follows and, in part, will be apparent from the description, or may be learned by practice of the presented example embodiments.

According to an example embodiment, there is provided a non-transitory computer-readable recording medium storing computer-readable instructions that, when executed by a first user terminal, cause the first user terminal to perform a method comprising receiving a first message including a first attached file, generating, based on a type of the first attached file, at least one encryption key for encrypting the first message, encrypting the first attached file using the at least one encryption key, adding sender information to the first message, the sender information associated with the first message, and transmitting the first message including the sender information to a message server.

In some example embodiments, the generating at least one encryption key may include generating a hash value of the first attached file as the encryption key of the first attached file.

In some example embodiments, when the type of the first attached file is a video file, the generating at least one encryption key may include generating a hash value of the first attached file as the encryption key of the first attached file.

In some example embodiments, the generating at least one encryption key may include generating a plurality of encryption keys for a plurality of second user terminals for transmitting the first message to the plurality of second user terminals.

In some example embodiments, the method may further include receiving a second message and an index associated with a second attached file, the second message transmitted by a second user terminal via the message server, extracting the index, calling from the message server the second attached file using the index, and decrypting the second attached file using a decryption key received from the second user terminal.

In some example embodiments, the method may further includes inputting an authentication key, the authentication key transmitted from a second user terminal via the message server, to read the first message from the second user terminal.

In some example embodiments, the inputting an authentication key may include transmitting the authentication key from the second user terminal to the message server, receiving a validation result with regard to the authentication key in response to the transmitted authentication key and transmitting the first message and the second message to the second user terminal according to the validation result.

In some example embodiments, the inputting the authentication key may include encrypting the first and second messages by using the authentication key and transmitting the encrypted first and second messages to the second user terminal.

According to an example embodiment, a user terminal includes a communicator, a memory, and at least one processor, which includes an input controller configured to receive a first message including a first attached file, the first message including sender information, a key generator configured to generate an encryption key for encrypting the first message by taking into account a type of the first attached file, an encryptor configured to encrypt the first attached file of the first message by using the encryption key, and a message transmitter configured to transmit the first message to a message server.

In some example embodiments, when a size of the first attached file is equal to or greater than a threshold value, the key generator may be further configured to generate a hash value of the first attached file as the encryption key of the first attached file.

In some example embodiments, when a type of the first attached file is a video file, the key generator may be further configured to generate a hash value of the first attached file as the encryption key of the first attached file.

In some example embodiments, when the first message is desired to be transmitted to a plurality of user terminals, the key generator may be further configured to generate a plurality of encryption keys for the respective user terminals.

In some example embodiments, the at least one processor may further include a message receiver configured to receive a second message and an index associated with a second attached file, the second message transmitted by a second user terminal via the message server, a data caller configured to extract an index and call from the message server the second attached file using the index, and a decryptor configured to decrypt the second attached file by using a decryption key received from the second user terminal.

In some example embodiments, the at least one processor may further include an authentication manager configured to input an authentication key, the authentication key transmitted from a second user terminal via the message server, to read the first message from the second user terminal.

In some example embodiments, the authentication manager may be further configured to transmit the authentication key from the second user terminal to the message server, receive a validation result with regard to the authentication key in response to the transmitted authentication key, and transmit the first message and the second message to the second user terminal according to the validation result.

In some example embodiments, the authentication manager may be further configured to encrypt the first and second messages by using the authentication key and transmitting the encrypted first and second messages to the second user terminal.

Other aspects, features, advantages will become apparent from the accompanying drawing, claims, and detailed descriptions of example embodiments.

BRIEF DESCRIPTION OF THE DRAWINGS

These and/or other aspects will become apparent and more readily appreciated from the following description of example embodiments, taken in conjunction with the accompanying drawings in which:

FIGS. 3B, 3C, and 3D are flowcharts of methods of operating a message server, according to an example embodiment;

DETAILED DESCRIPTION

Figure 1:
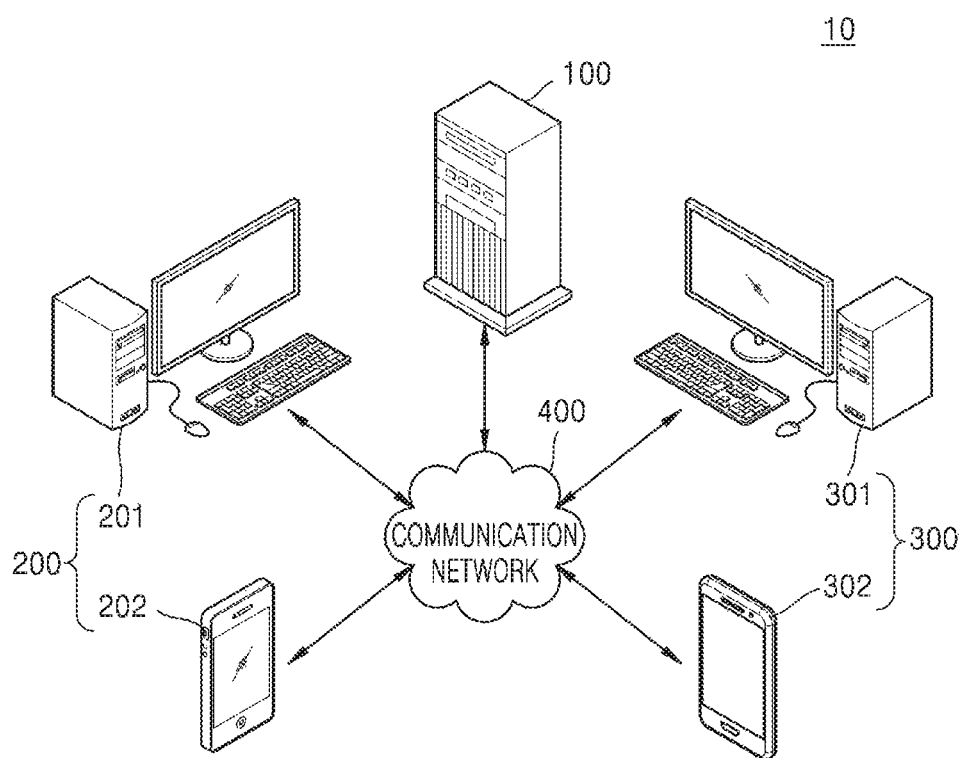
FIG. 1 is a schematic diagram of a system for transmitting and receiving a message, according to an example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In the following example embodiments, a "circuit" may include, for example, a hardwired circuit, a programmable circuit, a state machine circuit, and/or a firmware alone or in combination, which store instructions executed by a programmable circuit. An application may be implemented by codes or instructions that are executable on a programmable circuit, like a host processor or other programmable circuits. As used in the example embodiments, a module may be implemented by a circuit, and a circuit may be implemented by an integrated circuit such as an integrated circuit chip.

Also, the terms "unit", "-er/-or", and "module" used herein represent a device for processing at least one function or operation, which may be implemented by hardware, software, or a combination of hardware and software.

FIG. 1 is a diagram of a system 10 for transmitting and receiving a message, according to an example embodiment.

Referring to FIG. 1, the system 10 according to the example embodiment may include a message server 100, user terminals 200 and 300, and a communication network 400.

The message server 100 may transmit and receive messages between a plurality of user terminals 200 and 300. For example, the message server 100 may transmit or receive messages between the user terminals 200 and 300 through one or more procedures (e.g., a member registration procedure and/or a login procedure). Further, the message server 100 may provide a chat room, which enables chats between the plurality of user terminals 200 and 300. The message server 100 may control the chat room such that a chat input by a user or a chat received by a user in the chat room are shared with the other users in the chat room.

The message server 100 may transmit a chat-room invitation message to the user terminals 200 and/or 300 that have not completed, for example, the member registration procedure, the login procedure, or the like.

The message server 100 may encrypt or decrypt messages, chats, or talks between the user terminals 200 and 300. For example, the message server 100 may receive and transmit messages or process chats in the chat room by using the end-to-end encryption technology. Further, the message server 100 may transfer, for example, the messages encrypted by the end-to-end encryption technology to user terminals of senders as such, and may not store and/or manage information associated with decryption and/or decoding of the encrypted messages.

Further, the message server 100 may control transmissions such that a message to be transmitted to a user terminal 201 is transmitted to another user terminal 202 interacting with the user terminal 201. The message server 100 may perform an authentication process so as to confirm identity between the user terminal 201 and the user terminal 202. Further, the message server 100 may control transmissions such that an encryption key used for transmitting and receiving a message by the user terminal 201 is transmitted to the user terminal 202, which interacts with the user terminal 201. The encryption key may be transmitted and received in an encrypted state using an authentication key used for authenticating the user terminal 201 and the user terminal 202.

Also, the message server 100 may distribute a message transmission and reception application to the user terminals 200 and 300.

The users may access the message server 100 through the user terminals 200 and 300. The user terminals 200 and 300 may install the message transmission and reception application (e.g., computer program) thereon and may transmit and receive a message to and from the user terminals 200 and 300 by using the message transmission and reception application.

Further, the user terminals 200 and 300 may encrypt a message such that the message is not open to the public and transmit the encrypted message. The user terminals 200 and 300 may not share encryption-related information with the message server 100.

The user terminals 200 and 300 may mean communication terminals capable of using web services under wired and/or wireless communication environments. The user terminals 200 and 300 may be personal computers 201 and 301 of users, or may be mobile terminals 202 and 302 of users. The mobile terminals 202 and 302 are illustrated in FIG. 1 as smart phones, but are not limited thereto. As described above, the mobile terminals 202 and 302 may be any terminals on which applications capable of web browsing are installed. The user terminals 201, 202, 301, and 302 can be named, to distinguish from each other, as one of a first user terminal, a second user terminal, and a third user terminal. The first to third user terminals appearing in the following description are concepts included in the user terminals 200 and 300, and the first to third modifiers are added to distinguish them.

Examples of the user terminal 200 may include computers (e.g., a desktop computer, a laptop computer, a tablet computer, etc.), media computing platforms (e.g., a cable, a satellite set-top box, a digital video recorder, etc.), handheld computing devices (e.g., a personal digital assistant (PDA), an email client, etc.), any type of mobile phones, or any type of computing or communication platforms, but are not limited thereto.

The communication network 400 may connect the plurality of user terminals 200 and 300 to the message server 100. That is, for example, the communication network 400 may mean a communication network that provides a connection path so that the user terminals 200 and 300 transmit and receive data to and from the message server 100. Examples of the communication network 400 may include wired networks (e.g., local area networks (LANs), metropolitan area networks (MANs), or integrated service digital networks (ISDNs)) and wireless networks (e.g., wireless LANs, code division multiple access (CDMA), Bluetooth, or satellite communication), but are not limited thereto.

Figure 2:
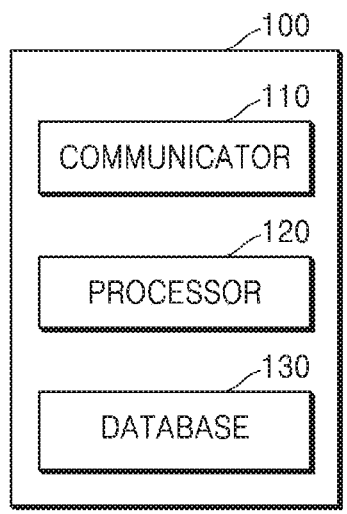
FIG. 2 is a block diagram of a message server according to an example embodiment.

FIG. 2 is a block diagram of a message server 100 according to an example embodiment.

Referring to FIG. 2, the message server 100 according to an example embodiment may include a communicator 110, a processor 120, and a database 130.

The communicator 110 may include one or more elements that enable communication between the message server 100 and one or more user terminals 200 and 300.

The communicator 110 may be a device including hardware and software desired for transmitting and receiving signals (e.g., a control signal and/or a data signal) through wired/wireless connections with other network devices.

The processor 120 may control an overall operation of the message server 100. For example, the processor 120 may control the communicator 110, the database 130, and the like by executing programs stored in the database 130.

The processor 120 may include any type of devices capable of processing data. The "processor" may mean a data processor embedded in hardware, which includes a circuit physically structured for performing functions represented by codes or commands included in a program. As discussed above, examples of the data processor embedded in the hardware may include a microprocessor, a central processing unit (CPU), a processor core, a multiprocessor, an application-specific integrated circuit (ASIC), and a field programmable gate array (FPGA), but are not limited thereto.

The database 130 may store programs for the processing and control of the processor 120, and input/output data (e.g., a plurality of menus, a plurality of first layer sub-menus corresponding to each of the plurality of menus, and/or a plurality of second layer sub-menus corresponding to each of the plurality of first layer sub-menus).

The database 130 may include at least one of a flash memory, a hard disk, a multimedia card micro-type memory, a card-type memory (e.g., SD or XD memory), random access memory (RAM), static random access memory (SRAM), read-only memory (ROM), electrically erasable programmable read-only memory (EEPROM), programmable read-only memory (PROM), a magnetic memory, a magnetic disk, or an optical disk. The message server 100 may operate a web storage or a cloud server based on a storage function of the database 130 on the Internet.

The programs, which are stored in the database 130, may be classified into a plurality of modules, for example, a user interface (UI) module, a touch screen module, and/or a notification module, according to functions thereof.

The message server 100 may transmit a message (e.g., a short message, an instant message, and/or an email) to the user terminals 200 and 300. The type of the message transmitted and received by the message server 100 is various and is not limited to one type.

Figure 3A:
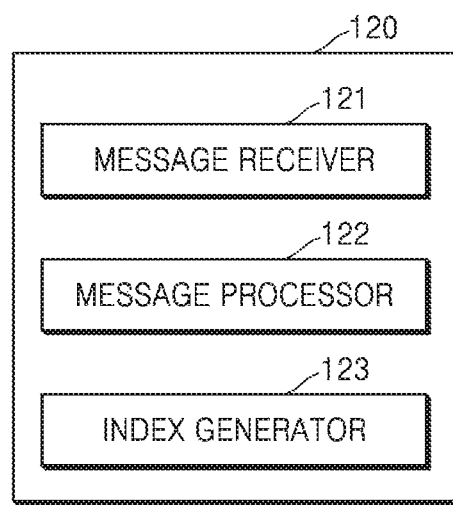
FIG. 3A is a block diagram of a processor of a message server, according to an example embodiment.

FIG. 3A is a block diagram of an example embodiment of the processor 120 of the message server 100.

Referring to FIG. 3A, the processor 120 of the message server 100 may include a message receiver 121, a message processor 122, and an index generator 123.

The message receiver 121 may receive a message from the user terminals 200 and 300. The message may include, for example, a title, contents, sender information, recipient information, and/or an attached file of the message. The message may include an attached file encrypted with an encryption key. The sender information and the recipient information of the message may include ID information, an email address, a phone number, or the like of a user. The attached file may include an image, a video, a voice file, link information, or the like. The message server 100 may transmit and receive messages between the user terminals 200 and 300 of the users who have been registered as a member through a member registration procedure.

The message processor 122 may transmit one or more messages received from one of the user terminal 200 and 300 to the other of the user terminal 200 and 300 of the message sender. When the message includes an encrypted attached file, the message processor 122 may transmit an index (e.g., only an index) for the attached file to the user terminal 200 or 300, instead of transmitting the attached file. For example, when one attached file is transmitted by or shared with many users, the message processor 122 may perform processing so that the attached file is transmitted or shared through one index, instead of storing and managing as many copies and indices of the attached file as the number of transmission or sharing of the attached file. For example, in the case of a video popular to people, an event to exchange the same video between lots of users may occur. In this case, if the message server 100 stores the video or generates the index corresponding to the video in each event (message transmission and reception) created by the users, resources are wasted. To mitigate such waste, the message processor 122 may be configured to determine whether there is a history indicating that the attached file of the received message has been transmitted and determine whether to newly generate metadata for the attached file.

The message processor 122 may transmit the message to another server, which is capable of receiving the message, according to the recipient information of the message, and/or may directly transmit the message to the user terminals 200 and 300.

The message processor 122 may receive a message including an attached file encrypted with an encryption key from the user terminal of the sender (the first user terminal, for example, the user terminal 201), and may transmit the message to the user terminal of the recipient (the second user terminal, for example, the user terminal 301). In addition, the message processor 122 may receive, from the user terminal 201 of the sender, data in which the encryption key used to encrypt the attached file or the message is encrypted with an asymmetric key, and may transmit the encrypted data to the user terminal 301 of the recipient. In this case, the asymmetric key encrypting the encryption key may be associated with the user terminal 201 of the sender and the user terminal 301 of the recipient, or the sender and the recipient.

The message processor 122 may receive a message including an attached file encrypted with an encryption key from the user terminal 201 of the sender, and may transmit the message to the user terminal of another recipient (the third user terminal, for example, the user terminal 302). In addition, the message processor 122 may receive, from the user terminal 201 of the sender, data in which the encryption key used to encrypt the attached file or the message is encrypted with an asymmetric key, and may transmit the data encrypted with the asymmetric key to the user terminal 302 of another recipient. In this case, the asymmetric key used to encrypt the encryption key may be associated with the user terminal 201 of the sender and the user terminal 302 of another recipient, or the sender and another recipient.

When the message processor 122 receives the message including the attached file encrypted with the encryption key, the message processor 122 may store the encrypted attached file. Also, the message processor 122 may associate the encrypted attached file with an index when storing the encrypted attached file in the database 130. When the message processor 122 receives, from the user terminal 301, a request for forwarding the attached file which had been received from the user terminal 201 to the user terminal of further another recipient (the fourth user terminal), the message processor 122 may transmit, to the fourth user terminal, the attached file encrypted with the encryption key by using the index associated with the attached file. In this case, in response to the request for forwarding the attached file to the fourth user terminal, the attached file corresponding to the forward request may be specified by using the index stored in the database 130 in association with the attached file, without receiving the attached file from the user terminal 301, newly storing the attached file, or newly generating the index.

When the message processor 122 receives the message including the encrypted attached file from the user terminal 201 of the sender, the message processor 122 may determine whether the encrypted attached file is stored in the server. In this case, the message processor 122 may store the encrypted attached file only when the encrypted attached file does not exist in the server.

In another example embodiment, when the message processor 122 receives the message including the encrypted attached file from the user terminal 201, the message processor 122 may store the encrypted attached file in the database. In addition, the message processor 122 may determine whether the encrypted attached file is duplicated on the database 130 according to a predetermined period or occurrence of a specific event. When the encrypted attached file is determined as duplicated on the database 130, the message processor 122 may deduplicate the encrypted attached file.

When the received message includes the encrypted attached file, the index generator 123 may generate an index capable of identifying the encrypted attached file, and generate a table in which the index corresponds to the attached file. The index generator 123 may generate an index corresponding to the attached file or the message.

Figure 3B:
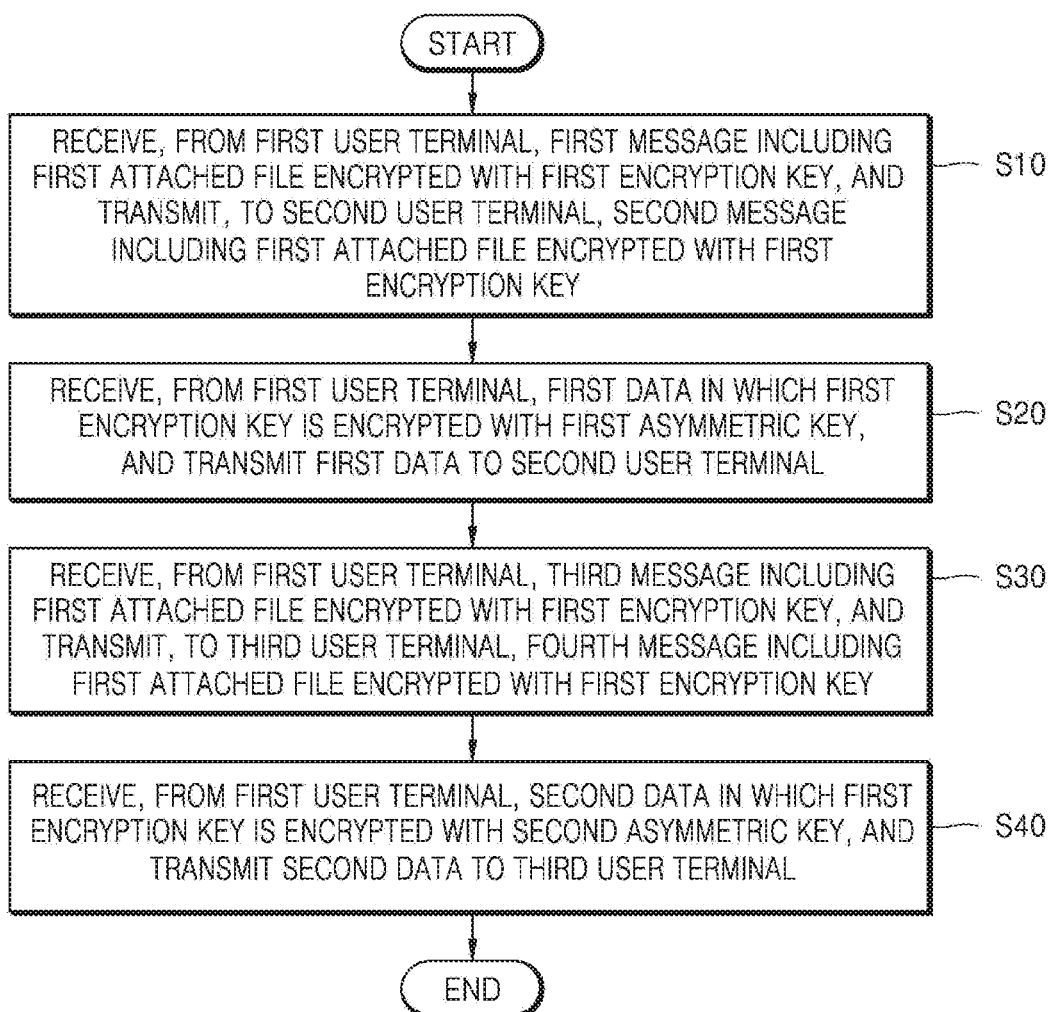
Figure 3C:
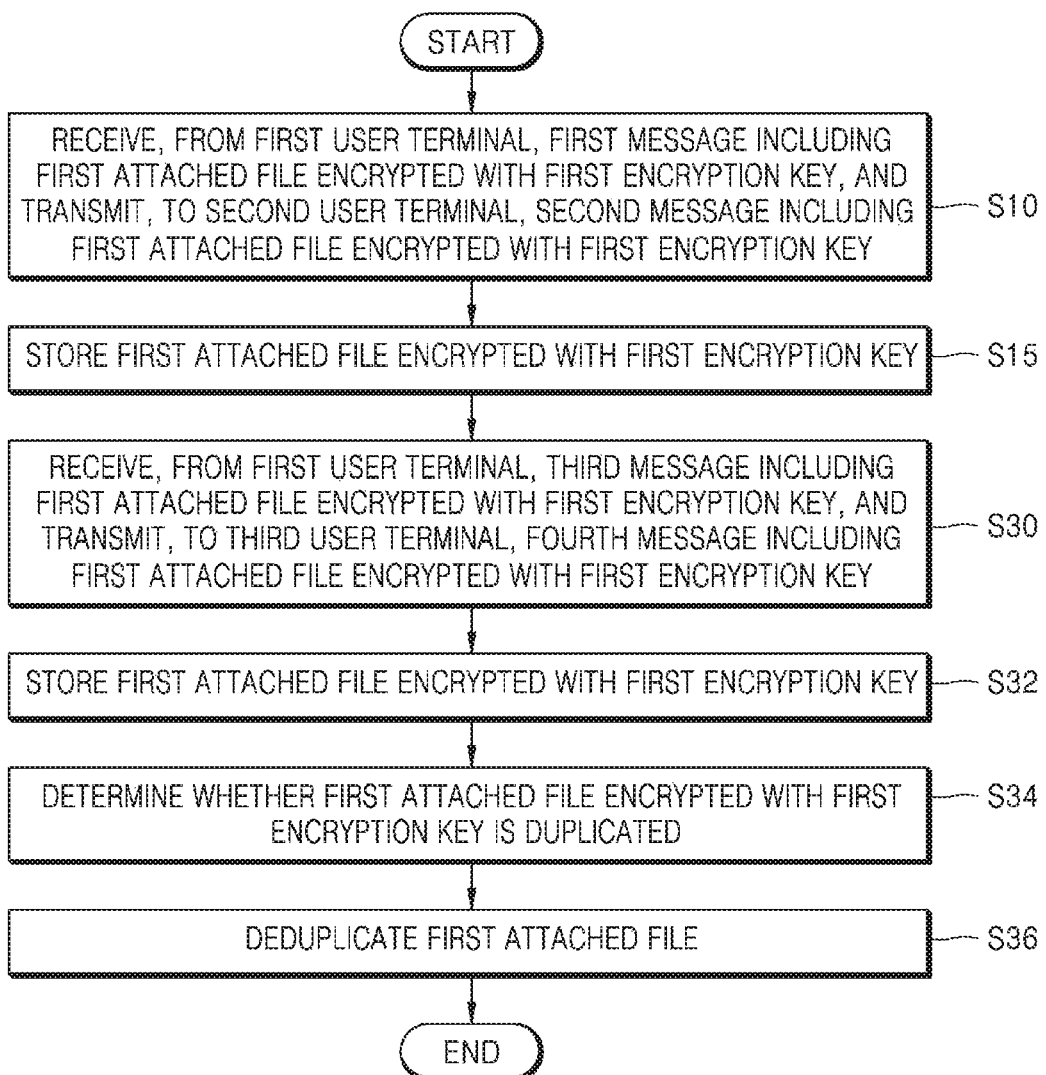

FIGS. 3B, 3C, and 3D are flowcharts of methods for operating a message server, according to an example embodiment.

In operation S10, the message server receives, from the first user terminal, a first message including a first attached file encrypted with a first encryption key, and transmits, to the second user terminal, a second message including the first attached file encrypted with the first encryption key. In this case, the second user terminal may be designated as the recipient in the first message received from the first user terminal.

In operation S20, the message server receives, from the first user terminal, first data in which the first encryption key is encrypted with a first asymmetric key, and transmits the first data to the second user terminal.

In operation S30, the message server receives, from the first user terminal, a third message including the first attached file encrypted with the first encryption key, and transmits, to the third user terminal, a fourth message including the first attached file encrypted with the first encryption key. In this case, the third user terminal may be designated as the recipient in the third message received from the first user terminal.

In operation S40, the message server receives, from the first user terminal, second data in which the first encryption key is encrypted with a second asymmetric key, and transmits the second data to the third user terminal.

As illustrated in FIG. 3C, when the message server receives the message including the encrypted attached file, the message server may store the attached file as it is received (that is, without decrypting the encrypted attached file). Also, the message server may determine whether the attached file is duplicated, and when determining that the attached file is duplicated, the server may deduplicate the encrypted attached file may be deduplicated. To determine whether the attached file is duplicated and deduplicate the attached file may be executed periodically. Specifically, in operation S15, when the message server receives the first message including the first attached file after operation S10, the message server may store the first attached file encrypted with the first encryption key. In addition, in operation S32, when the message server receives the third message including the first attached file after operation S30, the message processor may store the first attached file encrypted with the first encryption key.

In operation S34, the message server may determine whether the attached file is duplicated. In operation S36, the message server may deduplicate the attached file. For example, when the first attached file encrypted with the first encryption key is stored twice in operations S15 and S32, the message server may determine that the first attached file encrypted with the first encryption key is duplicated, may deduplicate the first attached file encrypted with the first encryption key, and may leave only one attached file encrypted with one first encryption key in the database 130.

As illustrated in FIG. 3D, the message server may generate and manage an index corresponding to the attached file in association to the attached file included in the message. Specifically, in operation S17, the message server may store the encrypted first attached file in association with the first index after operation S15. In operation S50, when the message server receives a request for forwarding the first attached file from the second user terminal, the message server may transmit, to the fourth user terminal, the first attached file encrypted with the first encryption key by using the first index. In operation S52, the message server receives third data in which the first encryption key is encrypted with a third encryption key associated with the second user terminal and the fourth user terminal. In operation S54, the message server transmits the third data to the fourth user terminal.

Figure 4:
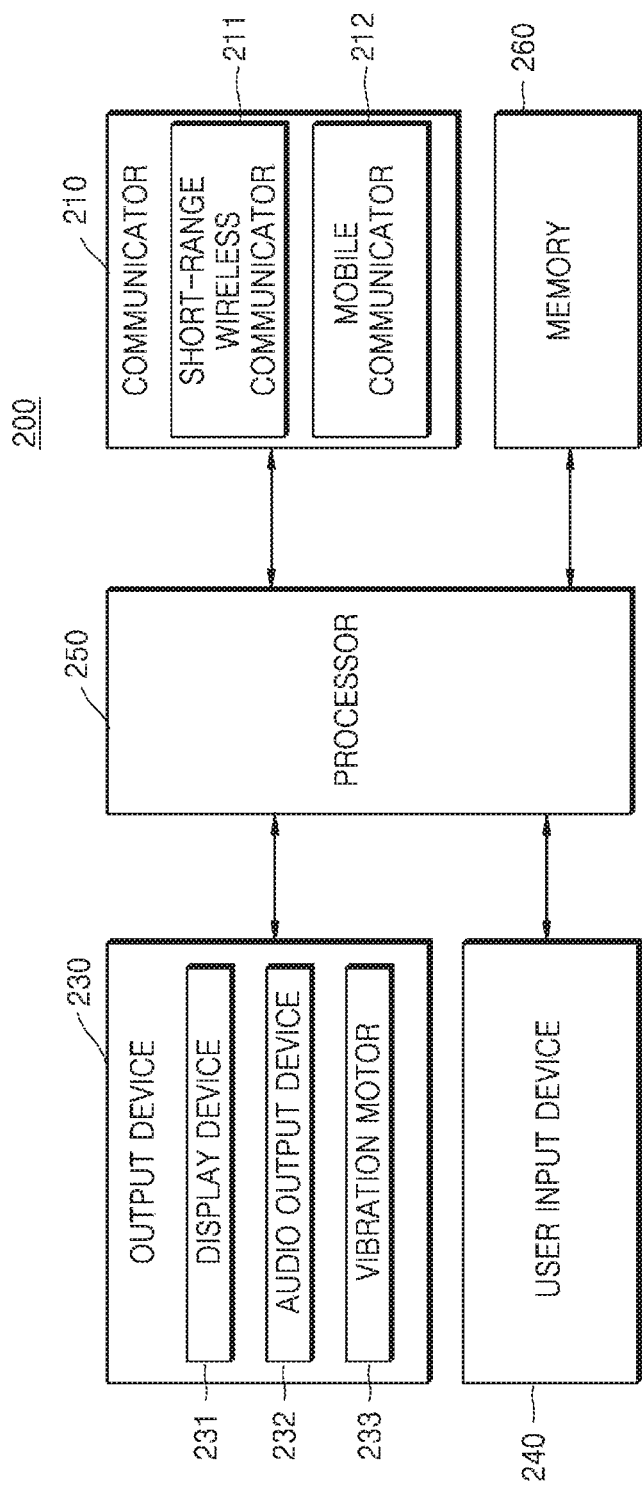
FIG. 4 is a block diagram of a user terminal according to an example embodiment.

FIG. 4 is a block diagram of the user terminal 200 or 300 according to an example embodiment.

Referring to FIG. 4, the user terminal 200 or 300 according to the example embodiment may include a communicator 210, a processor 250, and a memory 260, and may further include an output device 230 and a user input device 240.

The communicator 210 may include one or more elements that enable communication between the user terminals 200 and 300 or communication between the user terminals 200 and the message server 100. For example, the communicator 210 may include a short-range wireless communicator 211 and a mobile communicator 212.

Examples of the short-range wireless communicator 211 may include a Bluetooth communicator, a Bluetooth low energy (BLE) communicator, a near field communicator, a wireless LAN (WLAN) (Wi-Fi) communicator, a ZigBee communicator, an infrared data association (IrDA) communicator, a Wi-Fi direct (WFD) communicator, and/or an Ant+ communicator, but are not limited thereto.

The mobile communicator 212 may transmit and receive a radio signal to and from at least one of a base station, an external terminal, or a server over a mobile communication network. The radio signal may include a voice call signal, a video call signal, or various types of data according to the transmission and reception of text/multimedia messages.

The communicator 210 may receive a message from the message server 100 or other user terminals 200 and 300.

The output device 230 may include a display device 231, an audio output device 232, a vibration motor 233, and the like.

The display device 231 may output information processed by the user terminal 200. For example, the display device 231 may output a user interface provided when a message transmission and reception application is executed. The display device 231 may display a user interface associated with the message generation or message reception according to the installed message transmission and reception application. The display device 231 may display different user interfaces according to versions of the installed message transmission and reception application. When a received message is an encrypted message, the display device 231 may display a screen requesting, for example, a user authentication. The display device 231 may provide a user interface configured to change according to a user input.

When the display device 231 includes a touch screen having a layered structure and a touch pad, the display device 231 may be used as an input device as well as an output device. The display device 231 may include at least one of a liquid crystal display, a thin film transistor-liquid crystal display, an organic light-emitting diode display, a flexible display, a three-dimensional (3D) display, or an electrophoretic display. According to some example embodiments, the message server 100 may include two or more display devices 231. In this case, the two or more display devices 231 may face each other by using a hinge.

The audio output device 232 may output audio data received from the communicator 210 or stored in the memory 260. Further, the audio output device 232 may output an audio signal associated with the functions performed by the user terminal 200 (e.g., a background sound output when the message application is executed and/or an effect sound generated whenever the message application performs an operation). The audio output device 232 may include, for example, a speaker or a buzzer.

The vibration motor 233 may output a vibration signal. For example, the vibration motor 233 may output a vibration signal corresponding to the output of the audio data or the image data (e.g., an effect vibration signal generated whenever a game application performs an operation or whenever an image changes as a result of the operation performed by the game application). Further, the vibration motor 233 may output a vibration signal when a touch is input to the touch screen.

The processor 250 may control overall operations of the user terminal 200. For example, the processor 250 may control the communicator 210, the output device 230, the user input device 240, and/or the memory 260 by executing programs stored in the memory 260.

The processor 250 may determine an operation corresponding to a user input and/or state information of the user terminal 200 based on metadata associated with a message transmission and reception application stored (e.g., pre-stored) in the memory 260.

The user input device 240 may be a device that allows the user to input data for controlling the user terminal 200. Examples of the user input device 240 may include a key pad, a dome switch, a touch pad (e.g., a capacitive-type touch screen, a resistive-type touch screen, an infrared beam-type touch screen, a surface acoustic wave-type touch screen, an integral strain gauge-type touch screen, or a piezo effect-type touch screen), a jog wheel, or a jog switch, but are not limited thereto.

The memory 260 may store programs for processing and control of the processor 250, and input/output data (e.g., a plurality of menus, a plurality of first layer sub-menus corresponding to each of the plurality of menus, and/or a plurality of second layer sub-menus corresponding to each of the plurality of first layer sub-menus).

The memory 260 may previously store the metadata associated with the message transmission and reception application.

The memory 260 may include at least one of a flash memory, a hard disk, a multimedia card micro-type memory, a card-type memory (e.g., SD or XD memory), RAM, SRAM, ROM, EEPROM, PROM, a magnetic memory, a magnetic disk, or an optical disk. Further, the user terminal 200 may operate a web storage or a cloud server based on a storage function of the memory 130 on the Internet.

Figure 5:
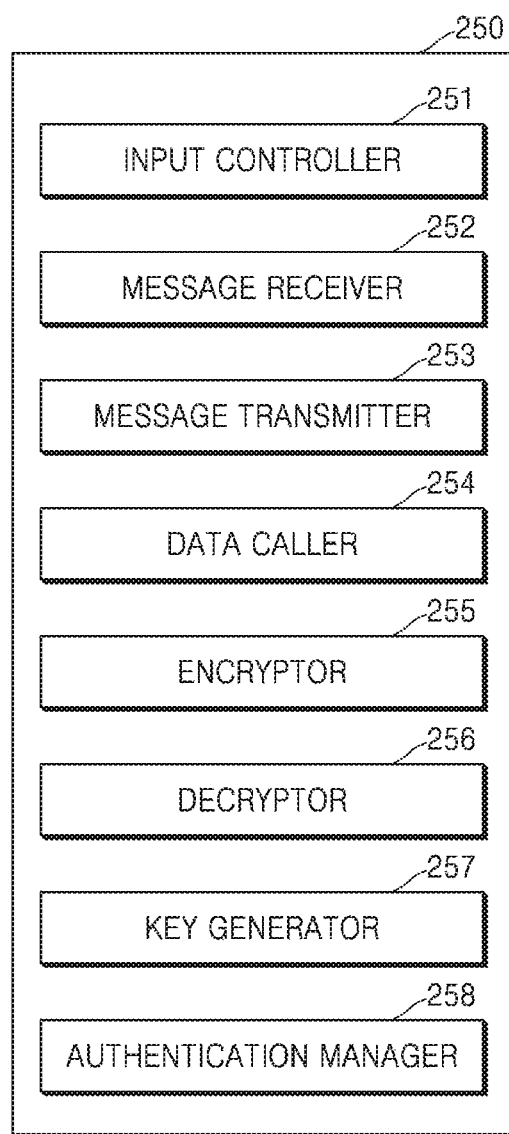
FIG. 5 is a block diagram of a processor of a user terminal, according to an example embodiment.

FIG. 5 is a block diagram of an example structure of the processor 250 of the user terminal 200 or 300.

Referring to FIG. 5, the processor 250 of the user terminal 200 or 300 may include an input controller 251, a message receiver 252, a message transmitter 253, a data caller 254, an encryptor 255, a decryptor 256, a key generator 257, and an authentication manager 258. First, the structure of the user terminal 200 will be described with reference to some example embodiments related to message transmission.

The input controller 251 may perform control an input operation of a first message. The input controller 251 may perform control so that the first message is generated according to an input signal input by the user input device 240. The input controller 251 may generate the first message including, for example, a title, contents, sender information, recipient information, and/or an attached file of the first message in response to the input signal input by a user.

The message transmitter 253 may transmit the first message to the second user terminal 200 or 300 corresponding to a recipient in the first message. The message transmitter 253 may change a format of the first message according to a protocol associated with the first message. For example, when the first message is transmitted and received through a communication network, such as a transmission control protocol/internet protocol (TCP/IP) or near-field communication (NFC), the message transmitter 253 may change a structure of the first message in compliance with a relevant communication standard. Further, the message transmitter 253 may encrypt parameters of the first message, for example, according to settings set by the user. That is, for example, the message transmitter 253 may encrypt and transmit the first message or transmit the first message without encrypting, according to security-related settings set by the user. In some example embodiments, the message transmitter may add sender information of the first message to the first message and transmit the resultant first message (which includes the sender information) to the user terminal 300.

The key generator 257 may generate an encryption key for encrypting the first message. The key generator 257 may generate the encryption key (private key) for encrypting the first message and a decryption key (public key) corresponding to the encryption key. A relationship between the encryption key and the decryption key may be symmetric or asymmetric.

The key generator 257 may generate a key for encrypting contents of the first message and a key for encrypting an attached file of the first message. First, as for an operation of generating the encryption key of the attached file, the key generator 257 may generate the encryption key of the attached file of the first message by taking into account, for example, a size of the attached file of the first message. For example, when the size of the attached file of the first message is smaller than a threshold size, the key generator 257 may generate a random value as the encryption key of the attached file, regardless of a type of the attached file.

When the size of the attached file of the first message is larger than the threshold size, the key generator 257 may generate a hash value of the attached file as the encryption key of the attached file. When the random value is generated as the encryption key of the attached file, the message server 100, which controls transmission and reception of messages between the user terminals 200 and 300, encrypts attached files having the same contents into files having different contents, and thus, many resources are utilized so as to manage the attached files. On the other hand, when the hash value is generated as the encryption key of the attached file, the message server 100 according to the example embodiment, which controls transmission and reception of messages between the user terminals 200 and 300, manages only one original file, regardless of how many user terminals the attached file is transmitted to or shared between.

The key generator 257 may generate the encryption key of the attached file of the first message by taking into account, for example, a type of the attached file of the first message. For example, when the attached file of the first message is a video file, the key generator 257 may generate the hash value of the attached file as the encryption key of the attached file. When the attached file of the message is a voice file or an image file, the key generator 257 may generate the random value as the encryption key of the attached file regardless of the attached file.

In some example embodiments, the key generator 257 may generate the encryption key of the attached file of the first message by taking into account the number of recipients of the message or the number of times the first message is shared. For example, in a case where an input message is desired to be transmitted to many users and the number of recipients of the first message is equal to or greater than a threshold value, the key generator 257 may generate the hash value of the attached file as the encryption key of the attached file with respect to the recipients of the first message, instead of generating keys for encrypting the attached file according to recipient information of the first message. In a case where an input message is desired to be shared with many other users, and the number of times the message is shared is equal to or greater than the threshold value, the key generator 257 may generate the hash value of the attached file as the encryption key of the attached file, regardless of the sender or recipient of the message. Next, as for an operation of generating the encryption key for encrypting contents of the message, the key generator 257 may generate the encryption key for encrypting the contents of the message in a random manner. In this case, the encryption key may be generated in a random manner by taking into account, for example, recipient information, sender information, a sending time, and/or a sending date.

In another example embodiment, in the case of the first message to be transmitted to the user terminals 200 and 300 of a plurality of recipients, the key generator 257 may generate different encryption keys for the respective recipients. In the case that the first message is to be transmitted to the third user terminal 301 and the fourth user terminal 302, the key generator 257 may generate a first encryption key used to transmit the first message to the third user terminal 301 and a second encryption key used to transmit the first message to the fourth user terminal 302. In this case, the first encryption key and the second encryption key may be previously transmitted and received when a chat room is generated between the user terminals 200 and 300.

As for the hash value, the hash value of the attached file may be a value obtained by performing calculations on data of the attached file through a hash function or a hash algorithm, and may be a unique value for the attached file. Because the hash value is the unique value for the attached file, the fact that hash values of two different files are equal to each other may mean that the two files are substantially the same file. Examples of the hash function may include CRC32, md5, SHA-1, RIPEMD-128, and Tiger.

As for an encryption method, the user terminal 200 or 300 according to the present example embodiment may use an encryption method using an asymmetric key so as to prevent decryption of a message by a third party other than a sender and a recipient when the first message is transmitted and received between the sender and the recipient. That is, for example, the user terminal 200 or 300 according to the present example embodiment may generate a private key for encrypting the first message or a public key for decrypting the first message by the user terminal 200, which transmits the first message, or by the second user terminal 300, which receives the first message. A message encrypted by using a first private key may be decrypted by using a first public key corresponding to the first private key, and a message encrypted by using the first public key may be decrypted by using the first private key. That is, for example, the private key and the public key corresponding to the private key may have a correspondence relationship with respect to each other, and may be used to perform decryption or encryption. In symmetric cryptography, the same encryption key (private key) may be used for encryption and decryption. On the other hand, in asymmetric cryptography, a private key for encryption and a public key for decryption are in the relationship of a key and a lock with respect to each other, and it is relatively difficult to decrypt the public key from the private key. Examples of the symmetric cryptography may include DES, double DES, triple DES, AES, IDEA, SEED, Blowfish, and ARIA. Examples of the asymmetric cryptography may include RSA, DSA, ECC, ElGamal, and Rabin. The user terminal 200 or 300 according to the present example embodiment may encrypt the first message by using the symmetric cryptography.

The encryptor 255 may encrypt the contents and the attached file of the first message by using the encryption keys generated by the key generator 257. The encryptor 255 may encrypt the contents and the attached file of the first message by using one or more encryption keys. In an example embodiment, the encryptor 255 may encrypt the attached file by using a symmetric key generated in a random manner, or may calculate a hash value of the attached file. In another example embodiment, the encryptor 255 may encrypt the first message desired to be transmitted to a plurality of recipients by using each encryption key generated for the respective recipients. In addition, while encrypting an attached file with the same encryption key for the all recipients, the encryptor 255 may encrypt the encryption key with an asymmetric key according to the respective recipient. That is, the data in which the symmetric key or the hash value of the attached file used to encrypt the attached file is encrypted with the asymmetric key may be transmitted to the message server, and the asymmetric key may be an encryption key that is differently generated for each recipient with respect to the same sender.

The encryptor 255 selects an encryption method of the attached file by taking into account a size and a type of the attached file. When a size of the attached file is equal to or larger than a threshold size or a type of the attached file is a video, the encryptor 255 generates a hash value of the attached file as an encryption key, and when not, the encryptor 255 may generate a random encryption key. The encryptor 255 may transmit a hash value or an encryption key to the user terminal 300 of the recipient, and at this time, the encryptor 255 may transmit a key generated by encrypting the hash value or the encryption key to another encryption key. At this time, the other encryption key may be pre-shared with the recipient.

The user terminal 200 or 300 according to the present example embodiment may encrypt the contents of the first message or the attached file by using an encryption key generated in a random manner and transmit the first message to the message server 100. For example, the user terminal 200 or 300 may encrypt the contents of the first message by using an encryption key generated by taking into account the type or size of the attached file of the first message and transmit the message such that the contents of the message do not become public.

Next, the structure of the user terminal 200 or 300 will be described by focusing on some example embodiments related to message reception.

The message receiver 252 may receive a second message or an index corresponding to the second message, which is transmitted by the user terminal 300 via the message server 100. The message receiver 252 may receive a decryption key for decryption of the second message, along with the second message or the index corresponding to the second message. The user terminal 200 according to the present example embodiment may use the decryption key to transmit a response message for the second message. The index may be information generated and managed by the message server 100. Because transmission and reception of an index consume less resource than transmission and reception of a message, the index corresponding to the message may be transmitted without transmission and reception of the message itself.

When a message is transmitted and received without being encrypted, calling of data may not be needed. In the case of transmitting and receiving indexes (instead of the unencrypted message) respectively corresponding to the second message and an attached file thereof, the data caller 254 may extract the index associated with the attached file included in the second message and call the attached file by using the index corresponding to the attached file included in the second message from the message server 100. As for the contents of the second message, when the data caller 254 fails to receive the contents of the second message, the first user terminal 201 may call the contents of the second message by using the index corresponding to the second message. The data caller 254 may call one or more items included in the second message by using the index.

The decryptor 256 may decrypt the received index, the contents of the second message, the attached file, and the like, by using the decryption key.

A configuration related to a method of using a message transmission and reception service by using a plurality of terminals carried or possessed by the same user (e.g., the first user terminal 201 and another user terminal 202) is described next.

The authentication manager 258 may perform authentication on the user terminal 202 such that the user who transmits and receives messages through the user terminal 201 shares a transmission and reception history of the user terminal 201 with the user terminal 202.

Figure 6:
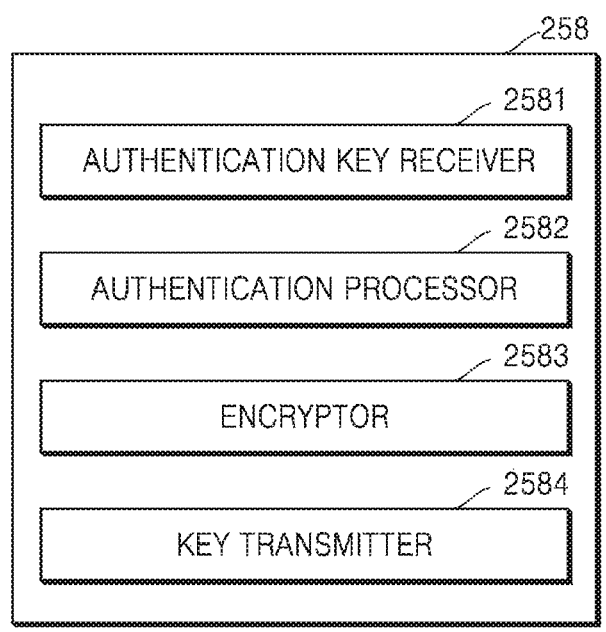
FIG. 6 is a block diagram of an authentication manager of a user terminal, according to an example embodiment.

As illustrated in FIG. 6, the authentication manager 258 may include an authentication key receiver 2581, an authentication key processor 2582, an encryptor 2583, and a key transmitter 2584.

First, the user may need to complete a login procedure through a message transmission and reception application so as to transmit and receive messages by using the user terminal 202. When a user ID and a password are identical to user information of the user terminal 201 in the login procedure, the message server 100 may transmit and receive messages through the user terminal 201 and the user terminal 202.

When messages are transmitted and received through the user terminal 201, the authentication key receiver 2581 of the user terminal 202, which is different from the user terminal 201, may receive a first authentication key for message sharing and message transmission and reception, from the message server 100.

The user terminal 202 may include the authentication key processor 2582, which is configured to input the received authentication key. The authentication key processor 2582 may input the authentication key received through the user terminal 201. Further, the authentication key processor 2582 may transmit a second authentication key to the message server 100. The authentication key processor 2582 may receive a result of determination of whether the second authentication key is valid, in response to the transmission of the second authentication key. When the first authentication key is identical to the second authentication key, the authentication key processor 2582 may receive a message indicating that authentication has been completed. Therefore, the second user terminal 202 may share with, for example, the first user terminal 201 one or more messages transmitted to and received through the user terminal 201.

Also, the authentication key processor 2582 may receive an encryption key or a decryption key from the user terminal 201 by using the authentication key. When message transmission and reception become possible through the authentication, the authentication key processor 2582 may enable decryption and encryption of a message by performing control to share the encryption key or the decryption key. In this case, the encryption key or the decryption key may be encrypted by using the authentication key and may be transmitted from the user terminal 201 to the user terminal 202.

The encryptor 2583 may encrypt a message by using the authentication key received through the authentication key processor 2582.

Therefore, the user may transmit and receive messages by using the user terminal 202 as well as the user terminal 201, and may read the messages, which are transmitted and received by the user terminal 201, through the user terminal 202.

As such, an attached file may be encrypted according to recipients, and resources required to individually store encrypted data may be saved. Since only index information for accessing an attached file having a large size is transferred between a sender and recipients rather than transferring the attached file itself, a storage space and communication capacity required for transferring of the attached file are reduced, and the attached file may be transferred by using such a storage space and the communication capacity. By transferring an encrypted index corresponding to an attached file included in a message transmitted to a lot of recipients instead of encrypting the attached file according to the recipients, a storage space and communication capacity required for transferring the attached file are reduced, and the attached file may be transferred by using the storage space and the communication capacity.

Figure 7A:
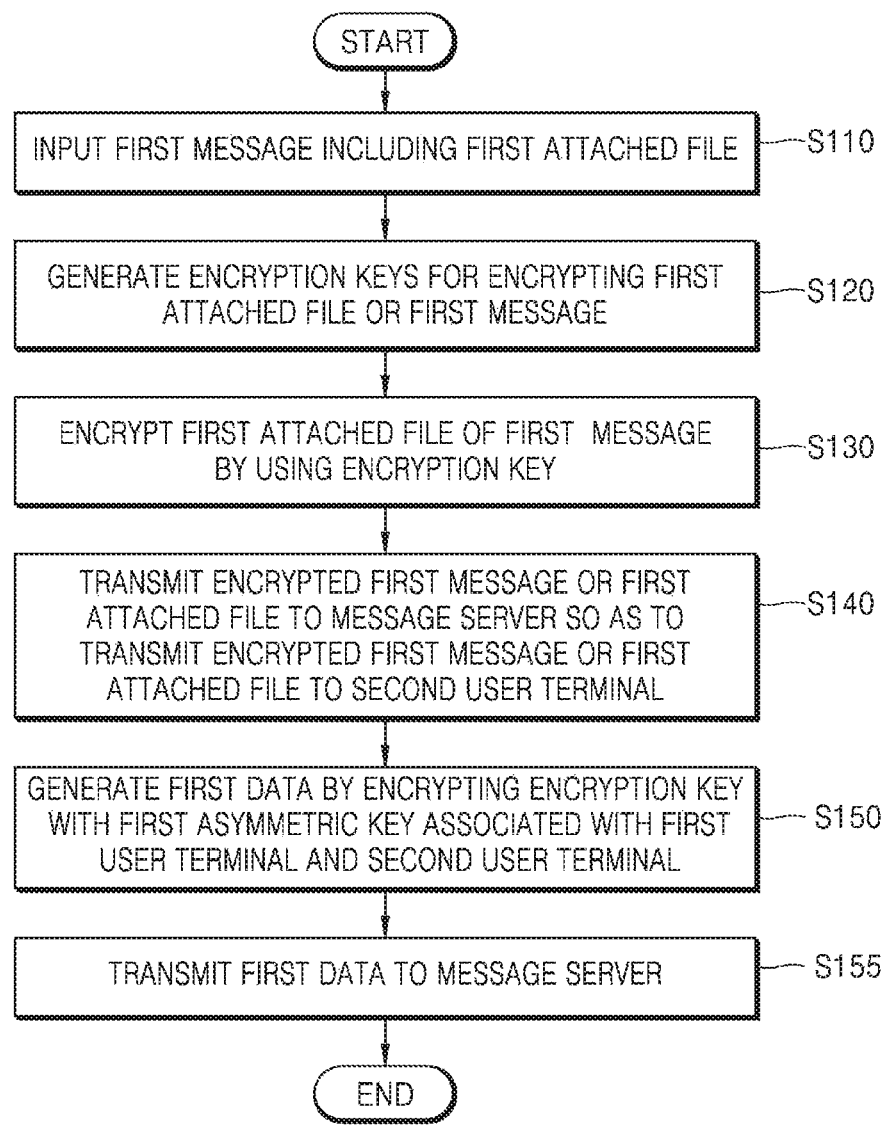
FIGS. 7A, 7B, and 8 are flowcharts of methods of transmitting and receiving a message, according to an example embodiment.
Figure 7B:
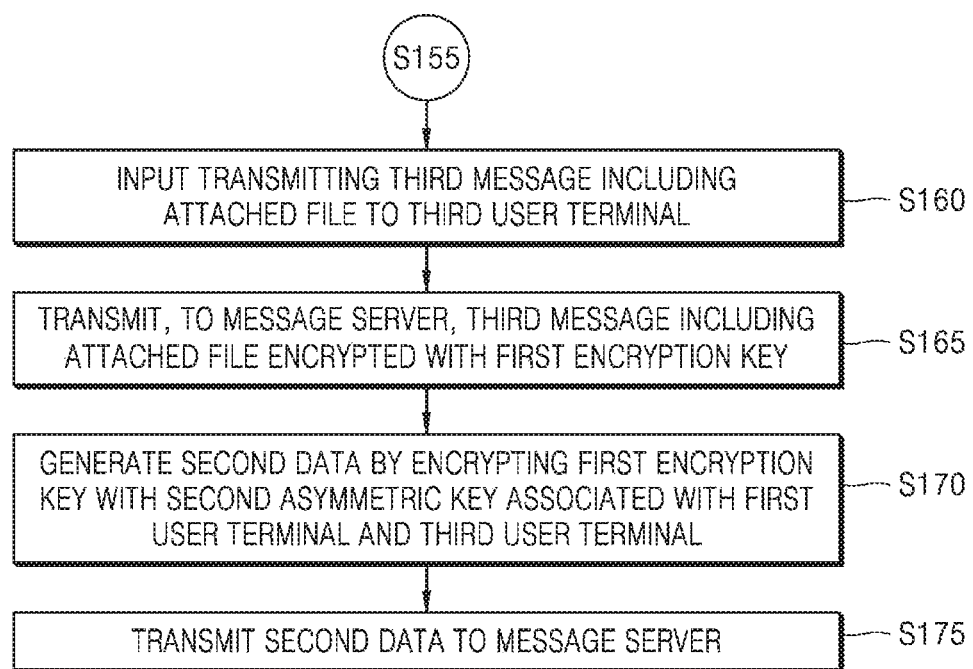
Figure 8:
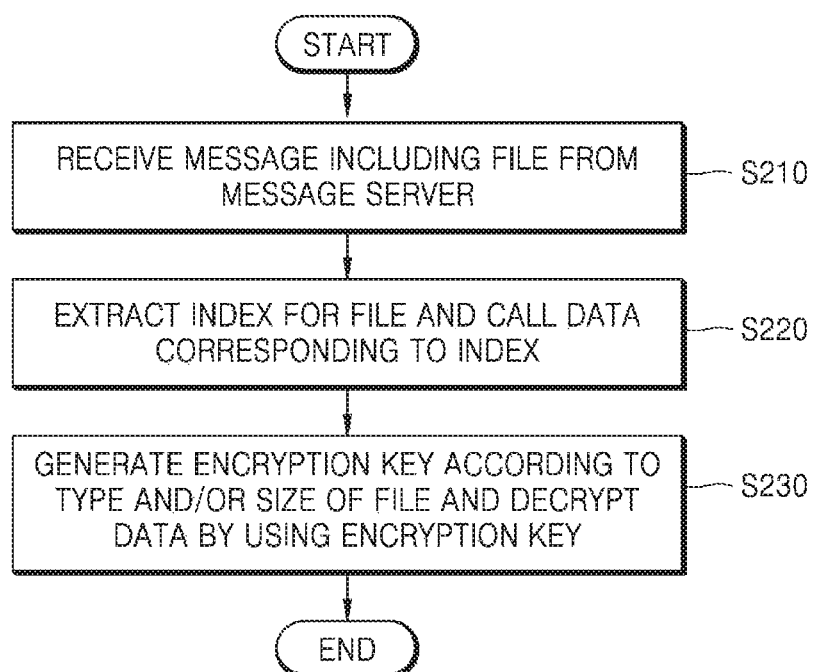

FIGS. 7A, 7B, and 8 are flowcharts of methods of transmitting and receiving messages, according to example embodiments.

In operation S110, the first user terminal 201 may input a first message including a first attached file. The first user terminal 201 may perform control such that the first message is generated according to an input signal which is input by the user input device 240. The first user terminal 201 may generate the first message including, for example, a title, contents, sender information, recipient information, and an attached file, of the first message, corresponding to the input signal input by a user.

In operation S120, the first user terminal 201 may generate an encryption key for encrypting the first message. In some example embodiments, the first user terminal 201 may generate the encryption key (private key) for encrypting the first message and a decryption key (public key) corresponding to the encryption key.

The first user terminal 201 may generate a key for encrypting contents of the first message and a key for encrypting an attached file of the first message. First, as for an operation of generating the encryption key of the attached file, the first user terminal 201 may generate the encryption key of the attached file of the first message by taking into account, for example, a size of the attached file of the message. For example, when the size of the attached file of the message is smaller than a given (or, alternatively, desired or predetermined) threshold size, the first user terminal 201 may generate a random value as the encryption key of the attached file, regardless of a type of the attached file. When the size of the attached file of the first message is larger than the given (or, alternatively, desired or predetermined) threshold size, the first user terminal 201 may generate a hash value of the attached file as the encryption key of the attached file.

The first user terminal 201 may generate the encryption key of the attached file of the first message by taking into account a type of the attached file of the message. When the attached file of the first message is a video file, the first user terminal 201 may generate a hash value of the attached file as the encryption key of the attached file. When the attached file of the first message is a voice file or an image file, the first user terminal 201 may generate a random value as the encryption key of the attached file regardless of the attached file.

Next, as for an operation of generating the encryption key for encrypting contents of the first message, the first user terminal 201 may generate the encryption key for encrypting the contents of the first message in a random manner. In this case, the encryption key may be generated in a random manner by taking into account, for example, the recipient information, the sender information, a sending time, and/or a sending date.

In another example embodiment, in the case that the first message generated by the first user terminal 201 is to be transmitted to a plurality of recipients, the first user terminal 201 may generate different encryption keys for the respective recipients. In the case of the first message to be transmitted to the third user terminal 301 and the fourth user terminal 302, the first user terminal 201 may generate a first encryption key used to transmit the first message to the third user terminal 301 and a second encryption key used to transmit the first message to the fourth user terminal 302.

In operation S130, the first user terminal 201 may encrypt the contents and an attached file of the first message by using the encryption keys generated by the key generator 257. The first user terminal 201 may encrypt the contents and the attached file of the first message by using one or more encryption keys (or cryptographic keys). The first user terminal 201 may encrypt the contents of the first message desired to be transmitted to a plurality of users by using the encryption keys generated for the respective users.

In operation S140, the first user terminal 201 may transmit the encrypted first message to the message server 100 so as to transmit the encrypted first message to the second user terminal (e.g., a recipient designated in the first message). The first user terminal 201 may transmit the encrypted attached file to the message server 100 such that the message server 100 transmits the encrypted attached file to the second user terminal.

In operation S150, the first user terminal 201 may generate first data by encrypting the encryption key, which is used to encrypt the attached file, with a first asymmetric key. The first asymmetric key may be generated in association with the designated recipient and the sender of the first message. That is, the first asymmetric key may be generated in association with the first user terminal and the second user terminal.

In operation S155, the first user terminal 201 may transmit the first data to the message server.

As illustrated in FIG. 7B, in operation S160, the first user terminal 201 may input an input of transmitting the third message including the attached file to the third user terminal after operation S155. In operation S165, the first user terminal 201 may transmits, to the message server 100, the third message including the attached file encrypted with the encryption key. In operation S170, the first user terminal 201 may generate the second data by encrypting the encryption key, which encrypts the attached file, with the second asymmetric key associated with the first user terminal and the third user terminal. In operation S175, the first user terminal 201 may transmit the second data to the message server 100.

Referring to FIG. 8, the method of transmitting and receiving messages according to the present example embodiment may include a message reception operation S210, a message calling operation S220, and a message decryption operation S230.

In operation S210, the first user terminal 201 may receive a second message or an index corresponding to the second message, which is transmitted by the second user terminal 301 via the message server 100. The first user terminal 201 may receive a decryption key for decrypting the second message, along with the second message or the index corresponding to the second message. In another example embodiment, the first user terminal 201 may receive, from the message server 100, the attached file encrypted with the first encryption key included in the second message transmitted by the second user terminal 301. In addition, the first user terminal 201 may receive, from the message server 100, data in which the first encryption key is encrypted with the asymmetric key. The asymmetric key may be generated according to a pair of a sender and a designated recipient (that is, a pair of a sender terminal and a recipient terminal). The sender may previously generate an asymmetric key and a decryption key corresponding to the asymmetric key in order for communication with the designated recipient, and may previously transmit the decryption key to the designated recipient through the server. In this case, the server may transmit the decryption key corresponding to the asymmetric key to the recipient terminal, and may not store the decryption key.

In operation S220, if a message is transmitted and received as it is (without being encrypted), calling of data is not needed. In the case of transmitting and receiving indexes corresponding to the second message and an attached file thereof, however, the first user terminal 201 may call the attached file by using the index corresponding to the attached file included in the second message. As for the contents of the second message, when the first user terminal 201 fails to receive the contents of the second message, the first user terminal 201 may call the contents of the second message by using the index corresponding to the second message. The first user terminal 201 may call one or more items included in the second message by using the index.

In operation S230, the first user terminal 201 may decrypt the received index, the contents and the attached file of the second message, and the like, by using the decryption key. In another example embodiment, the first user terminal 201 may decrypt the data, in which an encryption key is encrypted with an asymmetric encryption key, by using an asymmetric decryption key corresponding to the asymmetric encryption key which was previously received from the second user terminal 301 through the server, and acquire the encryption key of the attached file. In addition, the first user terminal 201 may decrypt the attached file using the acquired encryption key. When the first user terminal 201 fails to perform decryption, the first user terminal 201 may display a screen including contents requesting security for the second message. In order to obtain the decryption key, the first user terminal 201 may additionally receive an encryption key, and at this time, the encryption key used to encrypt the second message or the attached file may be encrypted by using another encryption key that is pre-received or pre-stored. In other words, the first user terminal 201 may obtain the encryption key by decrypting the encryption key.

Figure 9:
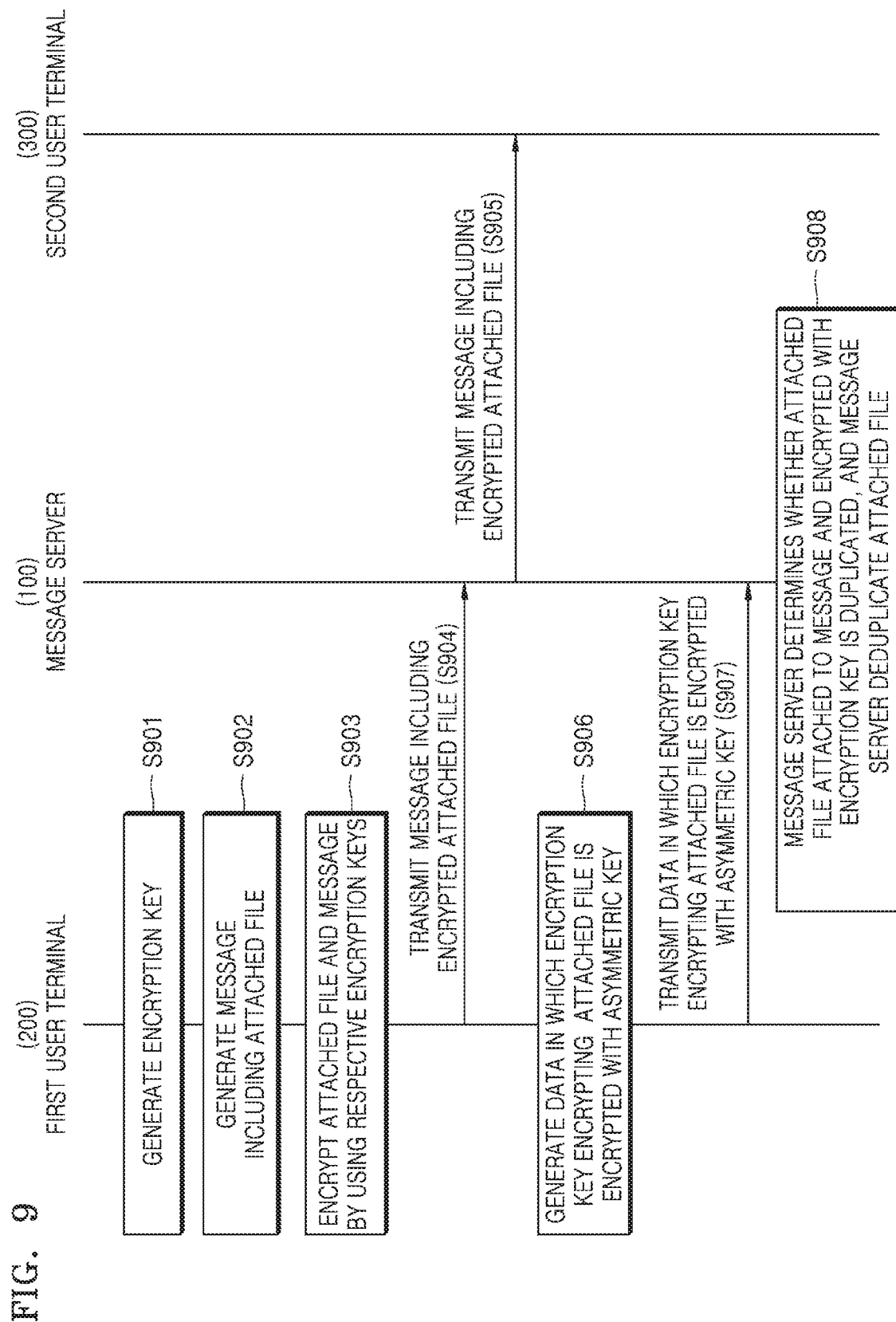
FIGS. 9 and 10 are flowcharts of data transmission and reception between user terminals and a message server.

FIG. 9 is a flowchart of an example embodiment of a method of transmitting and receiving messages between a user terminal 200 and a user terminal 300.

In operation S901, the user terminal 200 (e.g., first user terminal 201) may generate an encryption key for encrypting an input message. The first user terminal 201 may generate a decryption key corresponding to the encryption key. The encryption key may be generated to encrypt at least one of contents, an attached file of the message, a shared key used to encrypt the attached file, or a hash value of the attached file.

In operation S902, the user terminal 200 may receive a user input for generating the message including the attached file. In operation S903, the first user terminal 201 may encrypt the attached file and/or the contents of the message by using one or more encryption keys. In operation S904, the first user terminal 201 may transmit the first message including the attached file encrypted with the encryption key to the message server 100. In operation S905, the message server 100 may transmit a message including the encrypted attached file to the second user terminal 301. In operation S906, the first user terminal 201 may generate first data in which the encryption key used to encrypt the attached file is encrypted with an asymmetric key. In operation S907, the first user terminal 201 may transmit the first data to the message server 100.

The message server 100 receiving the first message stores the encrypted attached file. The message server 100 may store the attached file in association with the index. In operation S908, the message server 100 may determine whether the encrypted attached file attached to the first message is duplicated, and may deduplicate the encrypted attached file.

Figure 10:
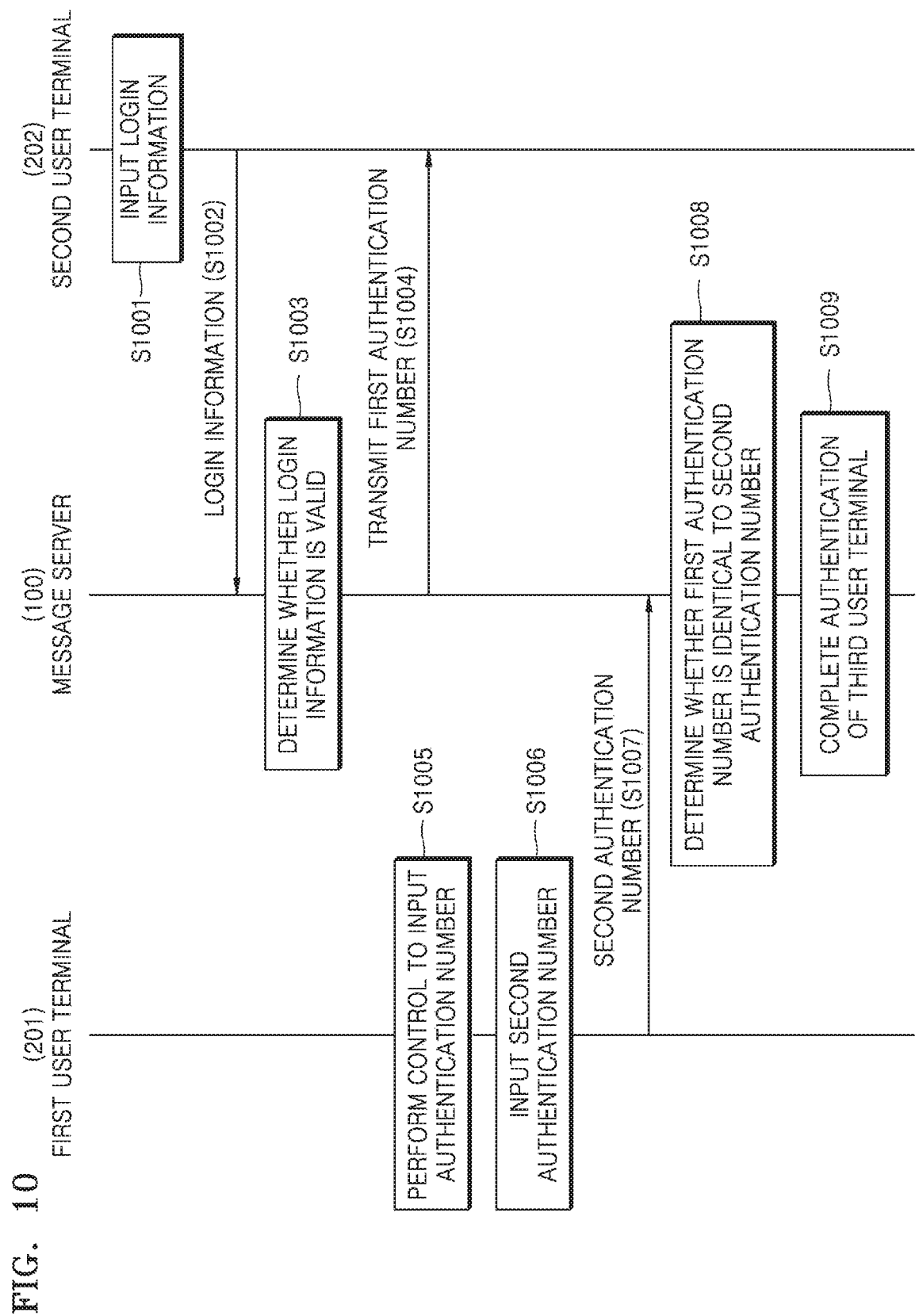

FIG. 10 is a flowchart of an example embodiment of a method of sharing a message between a first user terminal and another user terminal of the same possessor.

In operation S1001, a user carrying or possessing both the user terminal 201 and the user terminal 202 may input login information for message transmission and reception through the user terminal 202.

In operation S1002, the user terminal 202 may transmit the login information to the message server 100.

In operation S1003, the message server 100 may determine whether the login information is valid. That is, for example, the message server 100 may determine whether ID information and password information included in the login information are associated with each other.

In operation S1004, the message server 100 may determine whether an ID and a password of a first user are associated. When the login information is valid, the message server 100 may transmit a first authentication number generated in a random manner to the user terminal 202. Thereafter, a signal requesting the user to input the authentication number may be transmitted to the user terminal 201, which is also carried or possessed by the user.

In operation S1005, the first user terminal 201 may display a user interface requesting input of the authentication number in response to the signal.

In operation S1006, the user terminal 201 may receive a second authentication number through the user interface.

In operation S1007, the user terminal 201 may transmit the input second authentication number to the message server 100.

In operation S1008, the message server 100 may determine whether the first authentication number is identical to the second authentication number.

In operation S1009, when the first authentication number is identical to the second authentication number, the message server 100 may end authentication of the second user terminal 202.

After operations S1001 to operation S1009, the message server 100 may transfer messages received or transmitted by the user terminal 201 to the user terminal 202. Similarly, the message server 100 may transfer the messages received or transmitted by the user terminal 202 to the user terminal 201. That is, for example, the user terminal 201 and the user terminal 202 may share the same message transmission and reception history with each other.

In some example embodiments, information indicating whether each message is read may be different between the user terminal 201 and the user terminal 202. For example, the message which is read on the user terminal 201 may be displayed as being an unread message on the user terminal 202.

FIGS. 11 to 14 are diagrams illustrating examples of a user interface provided by a user terminal, according to some example embodiments.

Figure 11:
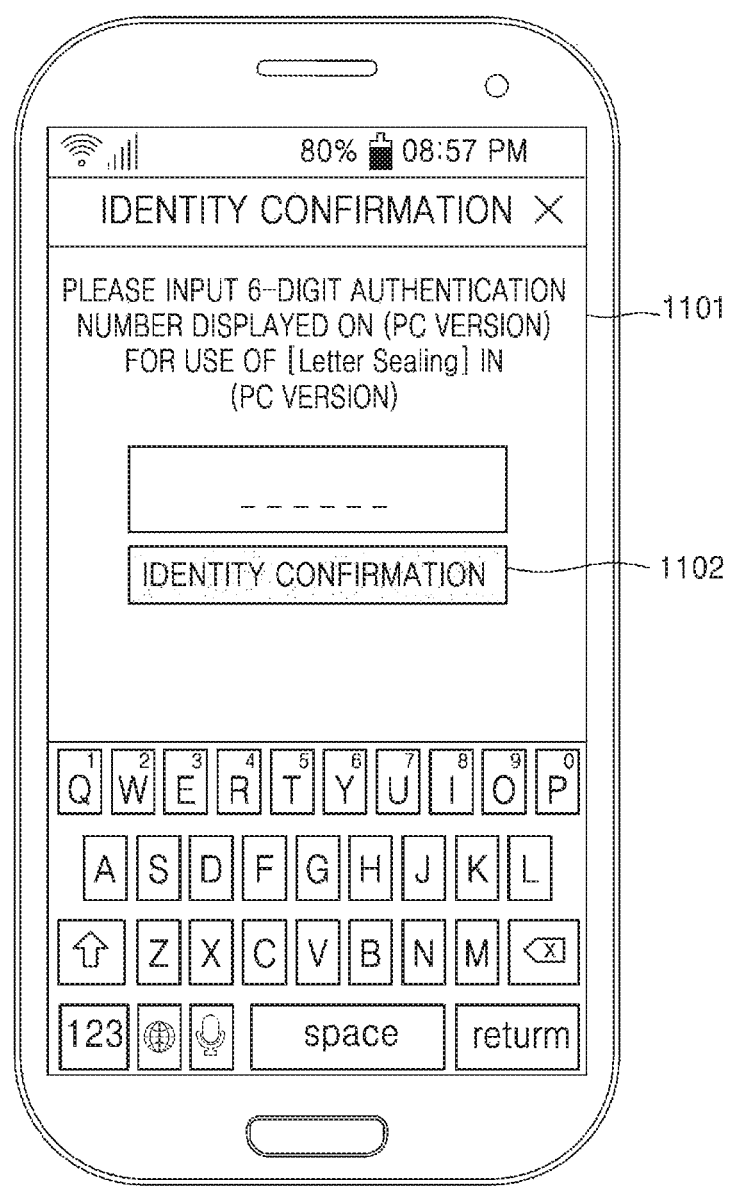
FIGS. 11 to 14 are diagrams illustrating examples of user interfaces according to some example embodiments.

In FIG. 11, reference numeral 1101 may represent a user interface displayed on the user terminal 201, which is a screen requesting input of an authentication number transmitted to the user terminal 202. As illustrated in FIG. 11, when the user inputs the authentication number that is a six-digit number and clicks an identity confirmation button 1102, the user terminal 201 may perform authentication.

Figure 12:
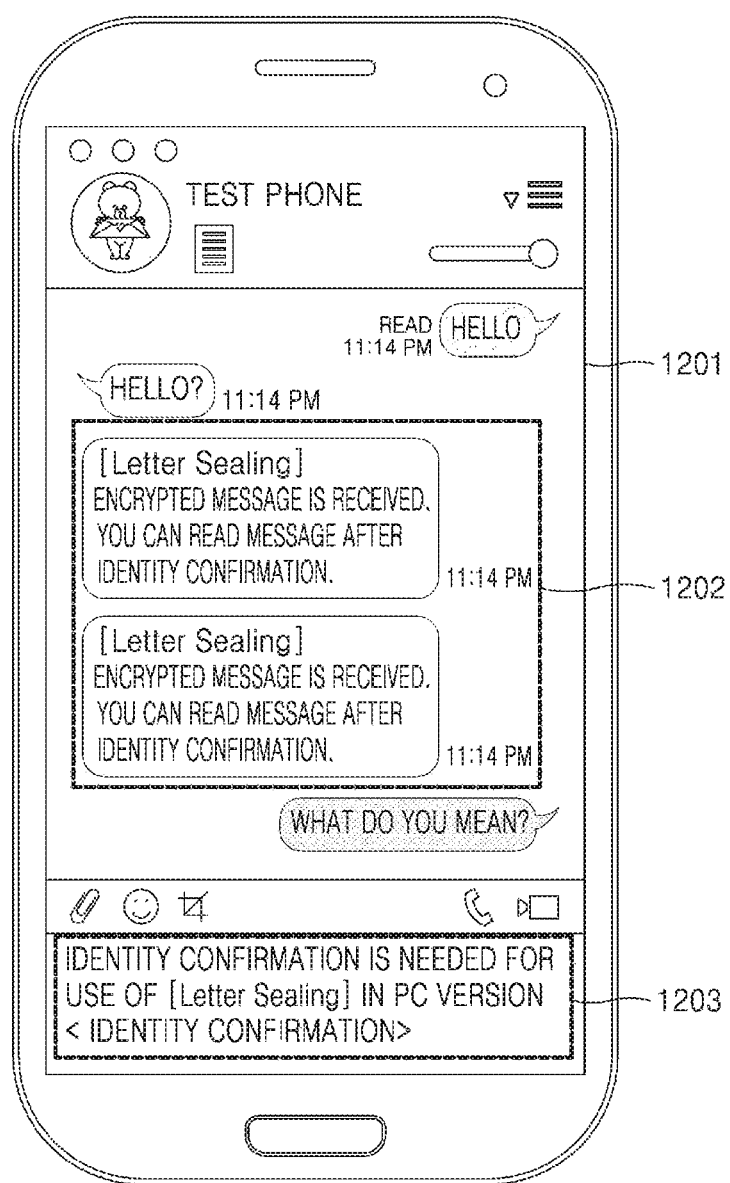

In FIG. 12, reference numeral 1201 may represent a user interface for displaying a message on the user terminal 200 or 300. The user terminal 200 or 300, which has not completed the identity confirmation, may display a message in an encrypted state (1202) and the user may need to separately perform the identity confirmation by clicking a button 1203 for the identity confirmation.

Figure 13:
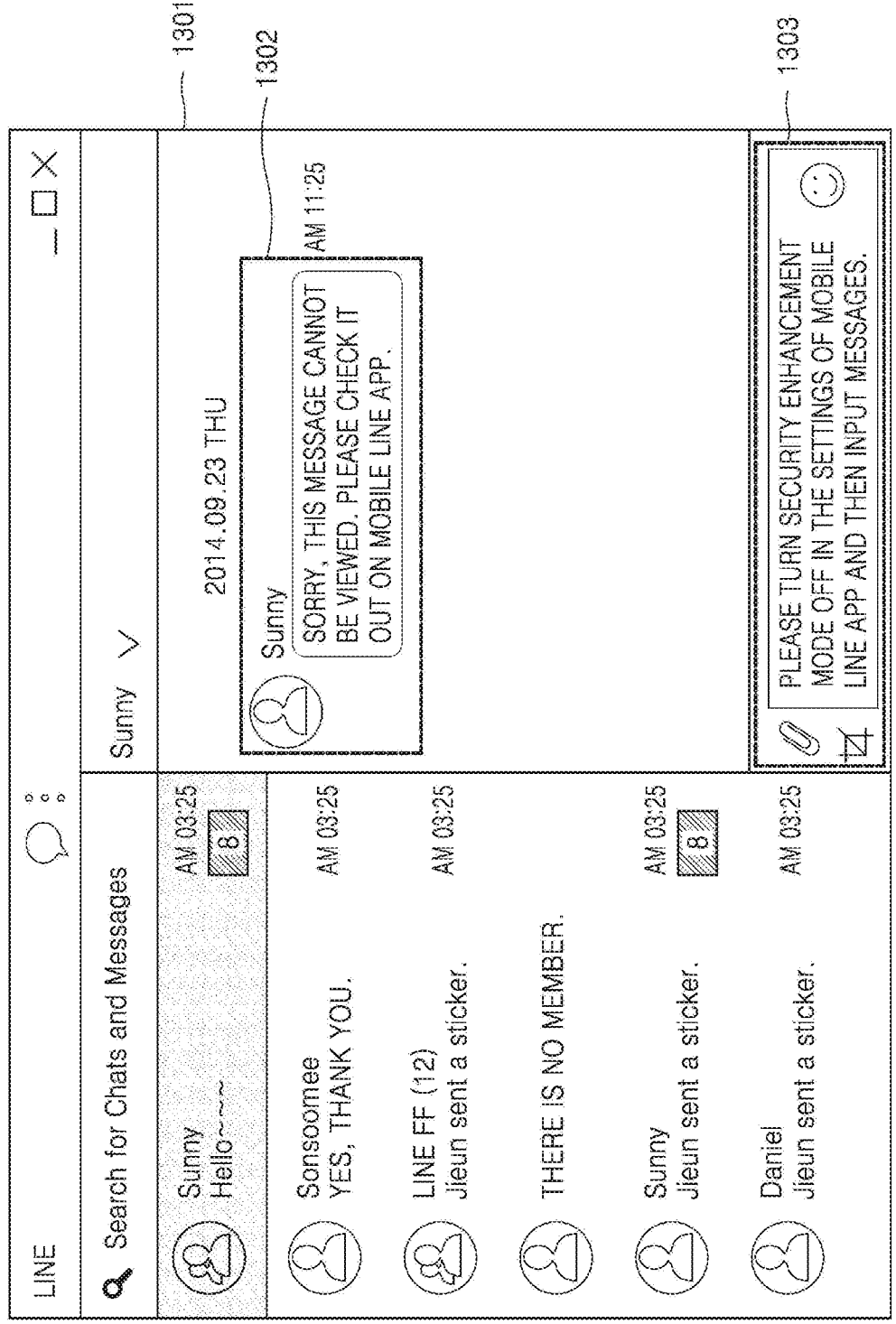

In FIG. 13, reference numeral 1301 may display both a screen displaying a list of one or more chat rooms created by the user and a screen displaying conversations in each of the chat rooms. When a counterpart transmits a message 1302, which needs an additional security procedure, the message may not be displayed even with respect to the user who has completed identify confirmation. Therefore, the user terminal 200 or 300 may perform control to request the user to complete the additional authentication procedure so as to read contents of the message (S1303).

Figure 14:
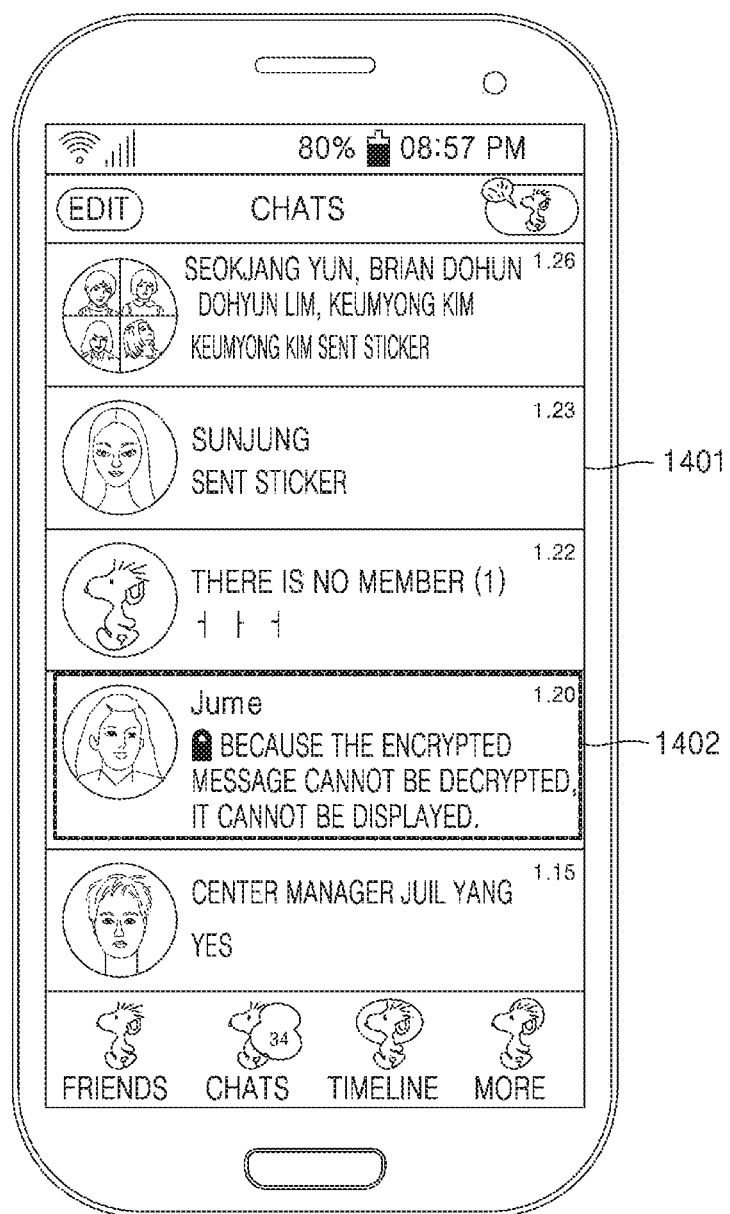

As illustrated in FIG. 14, reference numeral 1401 may display a list of chat rooms, and an encrypted message is not displayed in the list of chat rooms (1402).

Figure 15A:
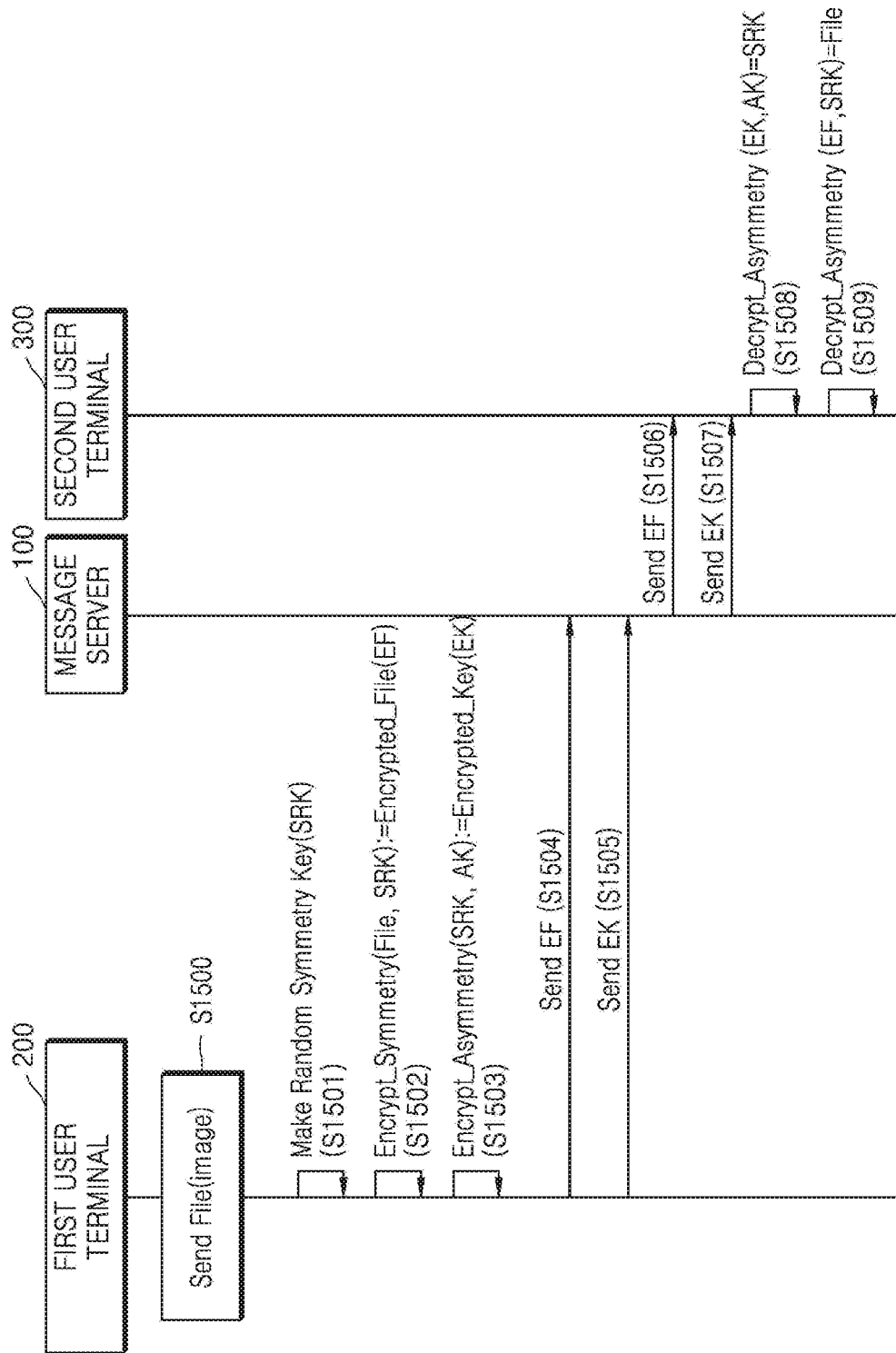
FIGS. 15A and 15B are diagrams illustrating encryption processes according to some example embodiments.
Figure 15B:
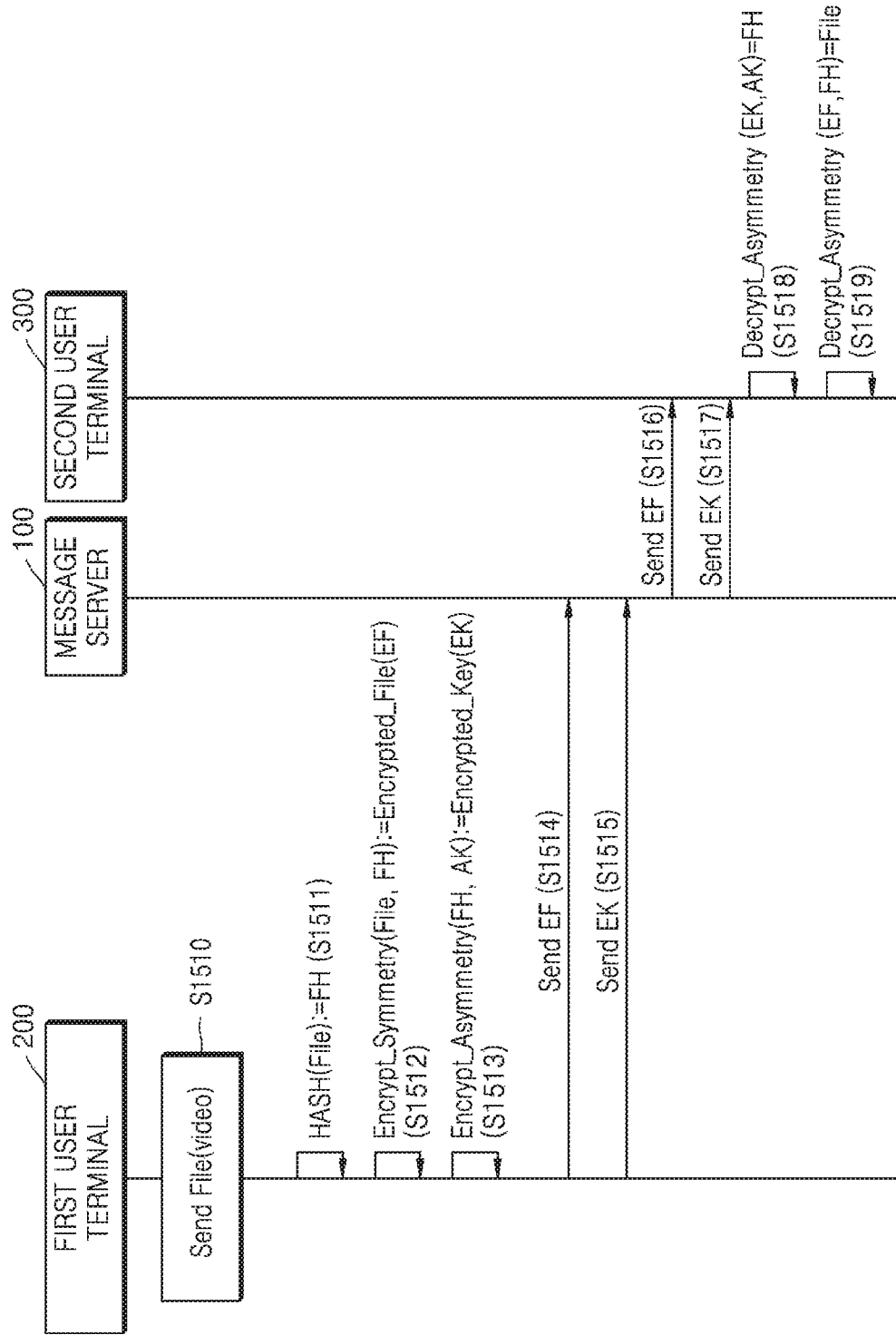

FIGS. 15A and 15B are diagrams for describing encryption processes in detail.

Referring to FIG. 15A, first user terminal 200 of a sender receives a request to transmit a file from the sender, in operation S1500. When a type of the file is an image or a size of the file is smaller than a threshold size, a message application installed in the first user terminal 200 generates a random first encryption key SRK for encrypting the file in operation S1501. The first user terminal 200 generates an encrypted file EF by encrypting the file using the first encryption key SRK in operation S1502, and generates an encrypted key EK by encrypting the first encryption key SRK using a second encryption key AK shared with a sender for message transmission and reception in operation 1503. In other words, in methods of transmitting and receiving messages, according to one or more embodiments, in order to prevent the first encryption key SRK generated to encrypt the file from leaking, the first encryption key SRK is encrypted by another encryption key, i.e., the second encryption key AK, for message transmission and reception. The first user terminal 200 transmits the encrypted file EF to the message server 100 in operation S1504, and transmits the encrypted key EK to the message server 100 in operation S1505. The message server 100 transmits the encrypted file EF and the encrypted key EK intactly to the second user terminal 300 respectively in operations S1506 and S1507. The second user terminal 300 of a recipient receives the encrypted file EF and the encrypted key EK through a message application installed therein. Before decrypting the encrypted file EF, the second user terminal 300 decrypts the encrypted key EK by using the second encryption key AK to obtain the first encryption key SRK in operation S1508. The second user terminal 300 decrypts the encrypted file EF by using the first encryption key SRK to generate the original file transmitted by then sender in operation S1509.

As shown in FIG. 15B, when the type of the file to be transmitted by the first user terminal 200 of the sender is a video or the size of the file is larger than the threshold size, a hash value FH of the file may be used as an encryption key.

The first user terminal 200 receives an input of file transmission from the sender in operation 1510, and calculates the hash value FH of the file in operation S1511. The first user terminal 200 generates the encrypted file EF by encrypting the file by using the hash value FH of the file, in operation S1512. The first user terminal 200 generates the encrypted key EK by encrypting the hash value FH using the second encryption key AK shared with the recipient in operation S1513. The first user terminal 200 transmits the encrypted file EF and the encrypted key EK to the message server 100 respectively in operations S1514 and S1515, and the message server 100 transmits the encrypted file EF and the encrypted key EK to the second user terminal 300 respectively in operations S1516 and S1517. The second user terminal 300 outputs the hash value FH by decrypting the encrypted key EK using the second encryption key AK before decrypting the file in operation S1518, and outputs the original file by decrypting the encrypted file EF using the hash value FH in operation S1519.

As discussed similarly above, the example embodiments set forth herein may be embodied as a computer program that is executable on a computer by various elements, and the computer program may be implemented by a non-transitory computer-readable medium. Examples of the non-transitory computer-readable medium may include magnetic media (e.g., a hard disk, a floppy disk, a magnetic tape, etc.), optical media (e.g., compact disc-read-only memory (CD-ROM), digital versatile disk (DVD), etc.), magneto-optical media (e.g., a floptical disk, etc.), and a hardware device specially configured to store and execute program instructions (e.g., ROM, random access memory (RAM), flash memory, etc.). The non-transitory computer-readable medium may include an intangible medium that is implemented to be transmittable on a network. For example, the non-transitory computer-readable medium may be implemented by software or applications that are transmittable and distributable via a network.

The computer program may be specifically designed and configured for the disclosure, or may be well known to and usable by those of ordinary skill in the field of computer software. Examples of the computer program may include not only machine language codes prepared by a compiler but also high-level codes executable by a computer by using an interpreter.

The particular implementations shown and described herein are illustrative examples of the disclosure and are not intended to otherwise limit the scope of the disclosure in any way. For the sake of brevity, conventional electronics, control systems, software, and other functional aspects of the systems may not be described in detail. Furthermore, the connecting lines or connecting members shown in the various figures are intended to represent example functional relationships and/or physical or logical connections between the various elements. It should be noted that many alternative or additional functional relationships, physical connections or logical connections may be present. Moreover, no component is essential to the practice of the example embodiments unless the element is specifically described as "essential" or "critical".

Recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure.

It should be understood that the example embodiments described herein should be considered in a descriptive sense only and not for purposes of limitation. Descriptions of features or aspects of each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of the inventive concept as defined by the following claims.

What is claimed is:

1. A message server comprising:
a memory configured to store computer-readable instructions; and
one or more processors configured to execute the computer-readable instructions,
wherein the one or more processors are further configured to,
receive, from a first user terminal by the message server, a first message including a first attached file encrypted with a first encryption key;
generate, by the message server, a first index to identify the first attached file;
transmit, to a second user terminal by the message server, a second message including the first index associated with the first attached file encrypted with the first encryption key;
in association with the first message, receive, from the first user terminal, first data in which the first encryption key is encrypted with a first asymmetric key associated with the first user terminal and the second user terminal, and transmit the first data to the second user terminal;
receive, from the first user terminal by the message server, a third message including the first attached file encrypted with the first encryption key;
transmit, to a third user terminal by the message server, a fourth message including the first index associated with the first attached file encrypted with the first encryption key; and
in association with the third message, receive, from the first user terminal, second data in which the first encryption key is encrypted with a second asymmetric key associated with the first user terminal and the third user terminal, and transmit the second data to the third user terminal;
wherein the first data is different from the second data, and the first data and the second data are generated by the first user terminal without using the message server;
wherein the first asymmetric key is different from the second asymmetric key; and
wherein the first encryption key is generated based on a type of the first attached file.

2. The message server of claim 1, wherein to receive the first message includes to receive, from the first user terminal, the first message including the first attached file encrypted with the first encryption key that has been randomly generated by the first user terminal.

3. The message server of claim 1, wherein to receive the first message includes to receive, from the first user terminal, the first message including the first attached file that has been encrypted by using a hash value of the first attached file by the first user terminal.

4. The message server of claim 1, wherein the one or more processors are further configured to:
store the first attached file encrypted with the first encryption key in response to the first message being received from the first user terminal;
store the first attached file encrypted with the first encryption key in response to the third message being received from the first user terminal;
determine whether the first attached file encrypted with the first encryption key is duplicated on the message server; and
deduplicate the first attached file encrypted with the first encryption key from the message server.

5. The message server of claim 4, wherein to deduplicate the first attached file includes to deduplicate the first attached file encrypted with the first encryption key from the message server according to a predetermined period.

6. The message server of claim 1, wherein the one or more processors are further configured to:
store the first attached file encrypted with the first encryption key on the message server in association with the first index;
in response to receiving a request for forwarding the first attached file to a fourth user terminal from the second user terminal, transmit the first attached file encrypted with the first encryption key to the fourth user terminal by using the first index; and
receive, from the second user terminal, third data in which the first encryption key is encrypted with a third asymmetric key associated with the second user terminal and the fourth user terminal, and transmit the third data to the fourth user terminal.

7. The message server of claim 1, wherein the one or more processors are further configured to:
determine whether the first attached file encrypted with the first encryption key is existed in the message server in response to the first message being received from the first user terminal; and
store the first attached file encrypted with the first encryption key in response to an absence of the first attached file encrypted with the first encryption key does in the message server.

8. A method for operating a message server, the method comprising:
receiving, from a first user terminal by the message server, a first message including a first attached file encrypted with a first encryption key;
generating, by the message server, a first index to identify the first attached file;
transmitting, to a second user terminal by the message server, a second message including the first index associated with the first attached file encrypted with the first encryption key;
in association with the first message, receiving, from the first user terminal, first data in which the first encryption key is encrypted with a first asymmetric key associated with the first user terminal and the second user terminal, and transmitting the first data to the second user terminal;
receiving, from the first user terminal by the message server, a third message including the first attached file encrypted with the first encryption key;
transmitting, to a third user terminal by the message server, a fourth message including the first index associated with the first attached file encrypted with the first encryption key; and
in association with the third message, receiving, from the first user terminal, second data in which the first encryption key is encrypted with a second asymmetric key associated with the first user terminal and the third user terminal, and transmitting the second data to the third user terminal;

wherein the first data is different from the second data, and the first data and the second data are generated by the first user terminal without using the message server;

wherein the first asymmetric key is different from the second asymmetric key; and wherein the first encryption key is generated based on a type of the first attached file.

9. The method of claim 8, wherein the first message includes the first attached file encrypted with the first encryption key randomly generated by the first user terminal.

10. The method of claim 8, wherein the first message includes the first attached file encrypted by using a hash value of the first attached file.

11. The method of claim 8, further comprising:

storing the first attached file encrypted with the first encryption key in response to the first message being received from the first user terminal;

storing the first attached file encrypted with the first encryption key in response to the third message being received from the first user terminal;

determining whether the first attached file encrypted with the first encryption key is duplicated on the message server; and deduplicating the first attached file encrypted with the first encryption key from the message server.

12. The method of claim 11, wherein the first attached file encrypted with the first encryption key is deduplicated from the message server according to a predetermined period.

13. The method of claim 8, further comprising:

storing the first attached file encrypted with the first encryption key on the message server in association with the first index;

transmitting the first attached file encrypted with the first encryption key to a fourth user terminal in response to a request for forwarding the first attached file to the fourth user terminal by using the first index from the second user terminal; and receiving, from the second user terminal, third data in which the first encryption key is encrypted with a third asymmetric key associated with the second user terminal and the fourth user terminal, and transmitting the third data to the fourth user terminal.

14. The method of claim 8, further comprising:

determining whether the first attached file encrypted with the first encryption key is existed in the message server in response to the first message being received from the first user terminal; and storing the first attached file encrypted with the first encryption key in response to an absence of the first attached file encrypted with the first encryption key in the message server.

15. A non-transitory computer-readable recording medium storing computer-readable instructions, the computer-readable instructions comprising:

receiving, from a first user terminal by a message server, a first message including a first attached file encrypted with a first encryption key;

generating, by the message server, a first index to identify the first attached file;

transmitting, to a second user terminal by the message server, a second message including the first index associated with the first attached file encrypted with the first encryption key;

in association with the first message, receiving, from the first user terminal, first data in which the first encryption key is encrypted with a first asymmetric key associated with the first user terminal and the second user terminal, and transmitting the first data to the second user terminal;

receiving, from the first user terminal by the message server, a third message including the first attached file encrypted with the first encryption key;

transmitting, to a third user terminal by the message server, a fourth message including the first index associated with the first attached file encrypted with the first encryption key; and in association with the third message, receiving, from the first user terminal, second data in which the first encryption key is encrypted with a second asymmetric key associated with the first user terminal and the third user terminal, and transmitting the second data to the third user terminal;

wherein the first data is different from the second data, and the first data and the second data are generated by the first user terminal without using the message server;

wherein the first asymmetric key is different from the second asymmetric key; and wherein the first encryption key is generated based on a type of the first attached file.

* * * * *